United States Patent
Stoica et al.

(10) Patent No.: US 12,363,316 B2
(45) Date of Patent: Jul. 15, 2025

(54) VIDEO CODEC IMPORTANCE INDICATION AND RADIO ACCESS NETWORK AWARENESS CONFIGURATION

(71) Applicant: Lenovo (Singapore) Pte. Ltd., New Tech Park (SG)

(72) Inventors: Razvan-Andrei Stoica, Essen (DE); Hossein Bagheri, Urbana, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 495 days.

(21) Appl. No.: 17/555,121

(22) Filed: Dec. 17, 2021

(65) Prior Publication Data

US 2023/0199198 A1    Jun. 22, 2023

(51) Int. Cl.
*H04N 19/164*    (2014.01)
*H04N 19/117*    (2014.01)
(Continued)

(52) U.S. Cl.
CPC ......... *H04N 19/164* (2014.11); *H04N 19/117* (2014.11); *H04N 19/136* (2014.11);
(Continued)

(58) Field of Classification Search
CPC .. H04N 19/117; H04N 19/136; H04N 19/164; H04N 19/188; H04N 19/189; H04N 19/70
See application file for complete search history.

(56) References Cited

U.S. PATENT DOCUMENTS

| 6,404,817 B1 | 6/2002 | Saha et al. |
| 6,754,278 B1 | 6/2004 | Suh et al. |

(Continued)

FOREIGN PATENT DOCUMENTS

| EP | 3041195 A1 | 1/2008 |
| EP | 2574010 A2 | 9/2012 |

(Continued)

OTHER PUBLICATIONS

3GPP, "3rd Generation Partnership Project; Technical Specification Group Services and System Aspects; System Architecture for the 5G System (5GS); Stage 2 (Release 17)", 3GPP TS 23.501 V17.2.0, Sep. 2021, pp. 1-542.

(Continued)

*Primary Examiner* — Maria E Vazquez Colon
(74) *Attorney, Agent, or Firm* — Kunzler Bean & Adamson

(57) ABSTRACT

Apparatuses, methods, and systems are disclosed for video codec importance indication and RAN awareness configuration. An apparatus includes a processor that detects a plurality of video coded network abstraction layer ("NAL") units of a video coded stream, extracts semantic information associated with the plurality of the NAL units, combines the extracted semantic information associated with the plurality of NAL units to form a plurality of feature sets that is correspondingly synchronized with the plurality of NAL units that enclose the extracted semantic information, determines an information-to-importance value for each of the plurality of NAL units based on the plurality of feature sets without performing video decoding of the video coded stream, and indicates the determined information-to-importance value for each of the plurality of NAL units of the determined video codec specification to a video coded (Continued)

traffic-aware transceiver for scheduling video traffic based on the indicated information-to-importance value.

20 Claims, 14 Drawing Sheets

(51) Int. Cl.
  *H04N 19/136* (2014.01)
  *H04N 19/169* (2014.01)
  *H04N 19/189* (2014.01)
  *H04N 19/70* (2014.01)

(52) U.S. Cl.
  CPC ......... *H04N 19/188* (2014.11); *H04N 19/189* (2014.11); *H04N 19/70* (2014.11)

(56) References Cited

U.S. PATENT DOCUMENTS

| | | |
|---|---|---|
| 6,909,450 B2 | 6/2005 | Paulin |
| 6,964,021 B2 | 11/2005 | Jun et al. |
| 7,886,201 B2 | 2/2011 | Shi et al. |
| 7,974,341 B2 | 7/2011 | Chen et al. |
| 7,987,415 B2 | 7/2011 | Niu et al. |
| 8,599,316 B2 | 12/2013 | Deever |
| 8,605,221 B2 | 12/2013 | Deever |
| 8,621,320 B2 | 12/2013 | Yang et al. |
| 8,654,834 B2 | 2/2014 | Cho et al. |
| 8,989,559 B2 | 3/2015 | Chen et al. |
| 9,386,326 B2 | 7/2016 | Noru et al. |
| 9,432,298 B1 | 8/2016 | Smith |
| 10,015,486 B2 | 7/2018 | Kumar et al. |
| 10,664,687 B2 | 5/2020 | Suri et al. |
| 10,764,574 B2 | 9/2020 | Teo et al. |
| 11,562,565 B2 | 1/2023 | Cristache |
| 11,917,206 B2 | 2/2024 | Stoica et al. |
| 2002/0146074 A1 | 10/2002 | Ariel et al. |
| 2009/0213938 A1 | 8/2009 | Lee et al. |
| 2011/0090921 A1* | 4/2011 | Anthru ............ H04N 21/23418 370/465 |
| 2019/0075308 A1* | 3/2019 | Wei ........................ H04L 69/168 |
| 2020/0106554 A1 | 4/2020 | Kannan et al. |
| 2020/0157058 A1 | 5/2020 | Lee et al. |
| 2020/0195946 A1* | 6/2020 | Choi .................... H04N 19/132 |
| 2020/0287654 A1 | 9/2020 | Xi et al. |
| 2020/0351936 A1 | 11/2020 | Kunt et al. |
| 2021/0028893 A1 | 1/2021 | Hwang et al. |
| 2021/0099715 A1 | 4/2021 | Topiwala et al. |
| 2021/0174155 A1 | 6/2021 | Smith et al. |
| 2021/0320956 A1 | 10/2021 | Berliner et al. |
| 2022/0413741 A1 | 12/2022 | Livis et al. |

FOREIGN PATENT DOCUMENTS

| | | | | |
|---|---|---|---|---|
| WO | WO-2008066257 A1 * | 6/2008 | ............ | H04H 20/46 |
| WO | 2020139921 A1 | 7/2020 | | |

OTHER PUBLICATIONS

ETSI, "Digital cellular telecommunications system (Phase 2+) (GSM); Universal Mobile Telecommunications System (UMTS) LTE; 5G; Transparent end-to-end packet switched streaming service (Release 16)", 3GPP TS 26.244, ESTI TS 126 244 V16.1.0, Oct. 2020, pp. 1-71.
ETSI, "Multiplexing and channel coding", 3GPP TS 38.212, ESTI TS 138 212 V16.5.0, Apr. 2021 pp. 1-155.
ETSI, "Physical layer procedures for data", 3GPP TS 38.214, ESTI TS 138 214 V16.5.0, Apr. 2021 pp. 1-173.
Rivaz, "AV1 Bitstream & Decoding Process Specification", 2018 The Alliance for Open Media, Jan. 2019, pp. 1-681.
Rahmani, "Compressed domain visual information retrieval based on I-frames in HEVC", SpringerLink, Mar. 4, 2016, pp. 1-14.
ETSI, "Extended Reality (XR) in 5G", 3GPP TR 26.928 ESTI TR 126 928 V16.1.0, Jan. 2021 pp. 1-133.
ITU-T, "Series H: Audiovisual and Multimedia Systems: Infrastructure of audiovisual services—Coding of moving video! Advanced video coding for generic audiovisual services", International Telecommunication Union, H.264, Aug. 2021, pp. 1-844.
ITU-T, "Series H: Audiovisual and Multimedia Systems: Infrastructure of audiovisual services—Coding of moving video; High efficiency video coding", International Telecommunication Union, H.265, Aug. 2021, pp. 1-716.
ITU-T, "Series H: Audiovisual and Multimedia Systems: Infrastructure of audiovisual services—Coding of moving video; Versatile video coding", International Telecommunication Union, H.266, Aug. 2020, pp. 1-516.
3GPP, "FS_XRTraffic: Permanent document, v0.8.0", Qualcomm Incorporated (Rapporteur), 3GPP TSG-SA4 Meeting #115e, S4211210, Aug. 27, 2021, pp. 1-130.
PCT/IB2022/062503, "Notification of Transmittal of the International Search Report and the Written Opinion of the International Searching Authority, or the Declaration", International Searching Authority, Feb. 27, 2023, pp. 1-16.
Ashfaq et al., "Hybrid Automatic repeat Request (HARQ) in Wireless Communications Systems and Standards: A Contemporary Survey", IEEE Communications Surveys & Tutorials, vol. 23, No. 4, July 2, 1021, pp. 1-42.
Ducla-Soares et al., "Error resilience and concealment performance for MPEG-4 frame-based video coding", Signal Processing. Image Communication, Elsevier Science Publishers, May 1, 1999, pp. 1-26.
Gao, "Flow-edge Guided Video Completion", European Conference on Computer Vision, Aug. 2020, pp. 1-17.
Ericsson, "CSI Feedback Enhancements for IIoT/URLLC", 3GPP TSG-RAN WG1 Meeting #104-e Tdoc R1-2100269, Jan. 25-Feb. 5, 2021, pp. 1-12.
Qualcomm Inc., "CSI enhancement for IOT and URLLC", 3GPP TSG RAN WG1 #104-e R1-2101460, Jan. 25-Feb. 5, 2021, pp. 1-18.
Mediatek Inc., "Further Potential XR Enhancements", 3GPP TSG RAN WG1 Meeting #106bis-e R1-2109556, Oct. 11-19, 2021.
Moderator of XR Enhancements (Nokia), Moderator's Summary on "[RAN94e-R18Prep-11] Enhancements for XR", 3GPP TSG RAN#94e RP-212671, Dec. 6-17, 2021, pp. 1-54.
Nokia, "New SID on XR Enhancements for NR", 3GPP TSG RAN Meeting #94e RP-212711, Dec. 6-17, 2021, pp. 1-5.
Sankisa, et. al., "Video error concealment using deep neural networks", 2018 25th IEEE International Conference on Image Processing (ICIP), Oct. 2018, pp. 1-5.
Shahriari et al., "Adaptive Error Concealment With Radial Basis Neuro-Fuzzy Networks For Video Communication over Lossy Channels," First International Conference on Industrial and Information Systems, Aug. 8-11, 2006, pp. 1-3.
Shannon, "A Mathematical Theory of Communication" The Bell System Technical Journal, vol. 27, Oct. 1948, pp. 1-55.
Strinati, et. al., "6G Networks: Beyond Shannon Towards Semantic and Goal-Oriented Communications", Computer Networks, Feb. 17, 2021, pp. 1-52.
3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.
3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.
Ulyanov, et. al., "Deep Image Prior", Proceedings of the IEEE Conference on Computer Vision and Pattern Recognition, 2018, pp. 1-9.
Zargari et al., "Visual Information Retrieval in HEVC Compressed Domain", 2015 23rd Iranina Conference on Electrical Engineering (ICEE), May 10-14, 2015, pp. 1-6.
Zhang, et. al., "Intelligent Image and Video Compression: Communicating Pictures", Academic Press; 2nd edition, Apr. 7, 2021, pp. 1-2.

(56) References Cited

OTHER PUBLICATIONS

PCT/IB2022/062496, "Notification of Transmittal of the International Search Report and the Written Opinion of the International Searching Authority, or the Declaration", International Searching Authority, Mar. 17, 2023, pp. 1-13.

PCT/IB2022/062500, "Notification of Transmittal of the International Search Report and the Written Opinion of the International Searching Authority, or the Declaration", International Searching Authority, Mar. 27, 2023, pp. 1-13.

Yip et al., "Joint source and channel coding for H.264 compliant stereoscopic video transmission", Electrical and Computer Engineering, IEEE, May 1, 2005, pp. 1-5.

Dung et al., "Unequal Error Protection for H.26L Video Transmission", Wireless Personal Multimedia Communications, IEEE, Oct. 27, 2002, pp. 1-6.

Naghdinezhad et al., "Frame distortion estimation for unequal error protection methods in scalable video coding (SVC)", Signal Processing, Elsevier Science Publishers, Jul. 30, 2014, pp. 1-16.

Perera et al., "QoE aware resource allocation for video communications over LTE based mobile networks", 10th International Conference on Heterogeneous Networking for Quality, Reliability, Security and Robustness, ICST, Aug. 18, 2014, pp. 1-8.

U.S. Appl. No. 18/317,781 Office Action Summary, USPTO, Jul. 25, 2024, pp. 1-32.

U.S. Appl. No. 18/317,781 Office Action Summary, USPTO, Nov. 12, 2024, pp. 1-8.

* cited by examiner

VIDEO CODEC IMPORTANCE INDICATION AND RADIO ACCESS NETWORK AWARENESS CONFIGURATION

FIELD

The subject matter disclosed herein relates generally to wireless communications and more particularly relates to video codec importance indication and radio access network awareness configuration.

BACKGROUND

In wireless networks, emerging applications such as augmented reality ("AR")/virtual reality ("VR")/extended reality ("XR"), cloud gaming ("CG"), device remote tele-operation (e.g., vehicle tele-operation, robot arms tele-operation, or the like), 3D video conferencing, smart remote education, or the like are expected to drive increase in video traffic. Even though the foregoing applications may require different quantitative constraints and configurations in terms of rate, reliability, latency, and quality of service ("QoS"), it is expected that such constraint sets will challenge current and future communications networks in delivering a high-fidelity quality of experience ("QoE") at ever increasing resolutions. As the quality of rendering end devices will increase and their costs will decrease with time, such applications are expected to steadily expand and furthermore also increase the bar on the QoE of end applications. As such it is of high interest to provide scalable and reliable solutions from a communications network perspective for the next generation media content delivery systems and their immersive digital reality applications.

BRIEF SUMMARY

Disclosed are procedures for video codec importance indication and radio access network ("RAN") awareness configuration. Said procedures may be implemented by apparatus, systems, methods, and/or computer program products.

In one embodiment, a first apparatus includes a processor that detects a plurality of video coded network abstraction layer ("NAL") units of a video coded stream according to defined syntax elements of a determined video codec specification. In one embodiment, the processor extracts semantic information associated with the plurality of the NAL units according to a syntax elements and semantic knowledge base defined within the determined video codec specification. In one embodiment, the processor combines the extracted semantic information associated with the plurality of NAL units to form a plurality of feature sets that is correspondingly synchronized with the plurality of NAL units that enclose the extracted semantic information. In one embodiment, the processor determines an information-to-importance value for each of the plurality of NAL units based on the plurality of feature sets without performing video decoding of the video coded stream. In one embodiment, the processor indicates the determined information-to-importance value for each of the plurality of NAL units of the determined video codec specification to a video coded traffic-aware transceiver for scheduling video traffic based on the indicated information-to-importance value In one embodiment, a first method includes detecting a plurality of video coded NAL units of a video coded stream according to defined syntax elements of a determined video codec specification. In one embodiment, the first method includes extracting semantic information associated with the plurality of the NAL units according to a syntax elements and semantic knowledge base defined within the determined video codec specification. In one embodiment, the first method includes combining the extracted semantic information associated with the plurality of NAL units to form a plurality of feature sets that is correspondingly synchronized with the plurality of NAL units that enclose the extracted semantic information. In one embodiment, the first method includes determining an information-to-importance value for each of the plurality of NAL units based on the plurality of feature sets without performing video decoding of the video coded stream. In one embodiment, the first method includes indicating the determined information-to-importance value for each of the plurality of NAL units of the determined video codec specification to a video coded traffic-aware transceiver for scheduling video traffic based on the indicated information-to-importance value.

In one embodiment, a second apparatus includes a processor that encodes and compresses an uncompressed video sequence to a video coded stream formed of a plurality of NAL units using a selected video codec specification. In one embodiment, the processor extracts semantic information associated with the plurality of the NAL units according to a syntax elements and semantic knowledge base defined within the determined video codec specification. In one embodiment, the processor combines the extracted semantic information associated with the plurality of NAL units to form a plurality of feature sets that is correspondingly synchronized with the plurality of NAL units that enclose the extracted semantic information. In one embodiment, the processor determines an information-to-importance value for each of the plurality of NAL units based on the plurality of feature sets without performing video decoding of the video coded stream. In one embodiment, the processor annotates the plurality of NAL units with the importance values for forming a plurality of application data units ("ADUs") of the video coded stream for packet-switched communication networks. In one embodiment, the processor signals the importance values for the plurality of ADUs and the plurality of underlying NAL units to a video coded traffic-aware transceiver.

In one embodiment, a second method includes encoding and compressing an uncompressed video sequence to a video coded stream formed of a plurality of NAL units using a selected video codec specification. In one embodiment, the second method includes extracting semantic information associated with the plurality of the NAL units according to a syntax elements and semantic knowledge base defined within the determined video codec specification. In one embodiment, the second method includes combining the extracted semantic information associated with the plurality of NAL units to form a plurality of feature sets that is correspondingly synchronized with the plurality of NAL units that enclose the extracted semantic information. In one embodiment, the second method includes determining an information-to-importance value for each of the plurality of NAL units based on the plurality of feature sets without performing video decoding of the video coded stream. In one embodiment, the second method includes annotating the plurality of NAL units with the importance values for forming a plurality of ADUs of the video coded stream for packet-switched communication networks. In one embodiment, the second method includes signaling the importance values for the plurality of ADUs and the plurality of underlying NAL units to a video coded traffic-aware transceiver. In one embodiment, the second method includes processing video coded traffic awareness information to determine optimized radio scheduling and control procedures for transmit and receive operations for the video coded stream ADUs and transmitting the video coded stream ADUs to a RAN based on the video coded traffic-aware optimizations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
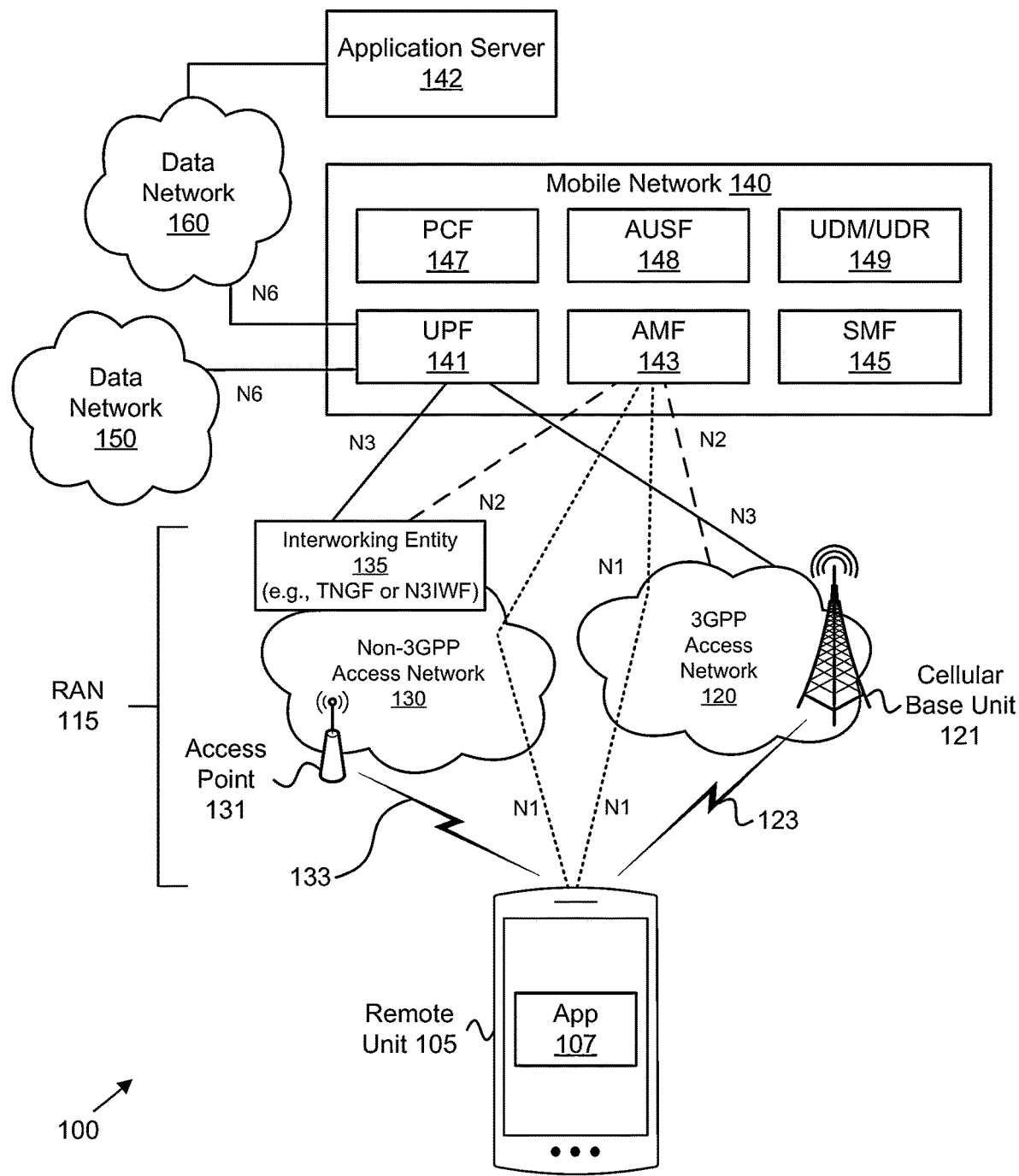
FIG. 1 is a schematic block diagram illustrating one embodiment of a wireless communication system for video codec importance indication and RAN awareness configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for video codec importance indication and RAN awareness configuration. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Emerging applications such as augmented reality ("AR")/virtual reality ("VR")/extended reality ("XR"), cloud gaming ("CG"), device remote tele-operation (e.g., vehicle tele-operation, robot arms tele-operation etc.), 3D video conferencing, smart remote education, or the like are expected to drive increase in video traffic. Even though the foregoing applications may require different quantitative constraints and configurations in terms of rate, reliability, latency, and quality of service ("QoS"), it is expected that such constraint sets will challenge current and future communications networks in delivering a high-fidelity quality of experience ("QoE") at ever increasing resolutions. As the quality of rendering end devices will increase and their costs will decrease with time, such applications are expected to steadily expand and furthermore also increase the bar on the QoE of end applications. As such it is of high interest to provide scalable and reliable solutions from a communications network perspective for the next generation media content delivery systems and their immersive digital reality applications.

Communications networks are one critical component of such applications. Another key technology in scaling the deployment of these immersive media experiences is the video encoding and compression of the source video information. This is critical in reducing the size of raw picture data to a point where communications systems can reliably transmit the video content over various challenging network conditions associated with mobile and wireless data systems and applications. Currently, the communications plane is completely separated from the video source encoding plane which makes the optimization of transmission strategies for reliable QoE of such video intensive applications difficult and/or limited. Despite current advances in video codec development (e.g., H.266 standard release), the data increase rates of high resolution multiview/AR/XR/3D applications exceed the compression gains. As such, it is of interest to develop mechanisms to aid the communications and access networks to understand codec specific semantics and exploit the latter in designing and configuring optimized transmission strategies for the mentioned video applications.

In one embodiment, this disclosure proposes a method to derive video codec data units' importance without decoding a video coded data stream, based on video codec syntax parsing and syntax elements extraction, semantic parsing and extraction of information as video coded data units' universal features, graphical directed information flow processing of importance per video coded data unit according to a kernel information-to-importance function metric and cumulative importance given modern hybrid video codecs hierarchical and encapsulation structures, and decoration of video data units with importance information for further processing by other network and RAN level blocks. In further embodiments, a system is disclosed to configure RAN functionality based on video codec awareness given the extraction of video coded data units importance at reduced latency without decoding of the video elementary streams.

FIG. 1 depicts a wireless communication system 100 for video codec importance indication and RAN awareness configuration, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing New Radio ("NR") Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. In one embodiment, the remote units 105 include devices for presenting virtual reality environments, augmented reality environments, and/or extended reality environments, e.g., head-mounted display units.

Moreover, the remote units 105 may be referred to as User Equipment ("UE") devices, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (e.g., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more QoS Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, e.g., a tunnel between the remote unit 105 and a Packet Gateway ("P-GW"), not shown, in an Evolved Packet Core Network ("EPC"). In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network, the EPC, to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a device, or by any other terminology used in the art. The cellular base units 121 are generally part of a RAN, such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (e.g., shared) radio spectrum.

The non-3GPP access networks 130 may be distributed over a geographic region. Each non-3GPP access network 130 may serve a number of remote units 105 within a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be apart of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or a EPC, which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (e.g., session establishment, modification, release), remote unit (e.g., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDMIUDR" 149.

In various embodiments, the mobile core network 140 may also include an Network Exposure Function ("NEF") (which is responsible for making network data and resources easily accessible to customers and network partners, e.g., via one or more Application Programming Interfaces ("APIs")), a Network Repository Function ("NRF") (which provides NF service registration and discovery, enabling NFs to identify appropriate services in one another and communicate with each other over APIs), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

In one embodiment, the network 100 includes an application server 142 that hosts applications for use by the mobile network 140, the RAN 115, the remote unit 105, and/or the like. As it relates to the subject matter disclosed herein, the application server 142 may host a video codec-aware application that is used to determine and indicate an importance of an underlying NAL unit of video coded elementary stream. The importance indicator may also be placed within the mobile network 140 (e.g., at the UPF 141), the RAN 115 (e.g., at the upper layers), and/or the like.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, a common setup adopted at the 3GPP level, e.g., 3GPP Technical Report TR 26.928 (v16.0.0—November 2020). 5G; Extended Reality (XR) in 5G; S4-211210: [FS_XRTraffic]: Permanent document, v0.8.0, Rapporteur Qualcomm Inc., (2021), for immersive XR and high-performance video content transmissions relies on the concept of split rendering. This uses an application server located at the edge and connected to a core network ("CN"), which is used to encode the application video content and transfer it to a RAN for mobile communications. In exchange, the RAN communicates with a connected UE, which may use additional hardware/software processing to render the video content to match a user's pose/inputs/control state. This architectural approach is displayed for reference in FIG. 2.

Figure 2:
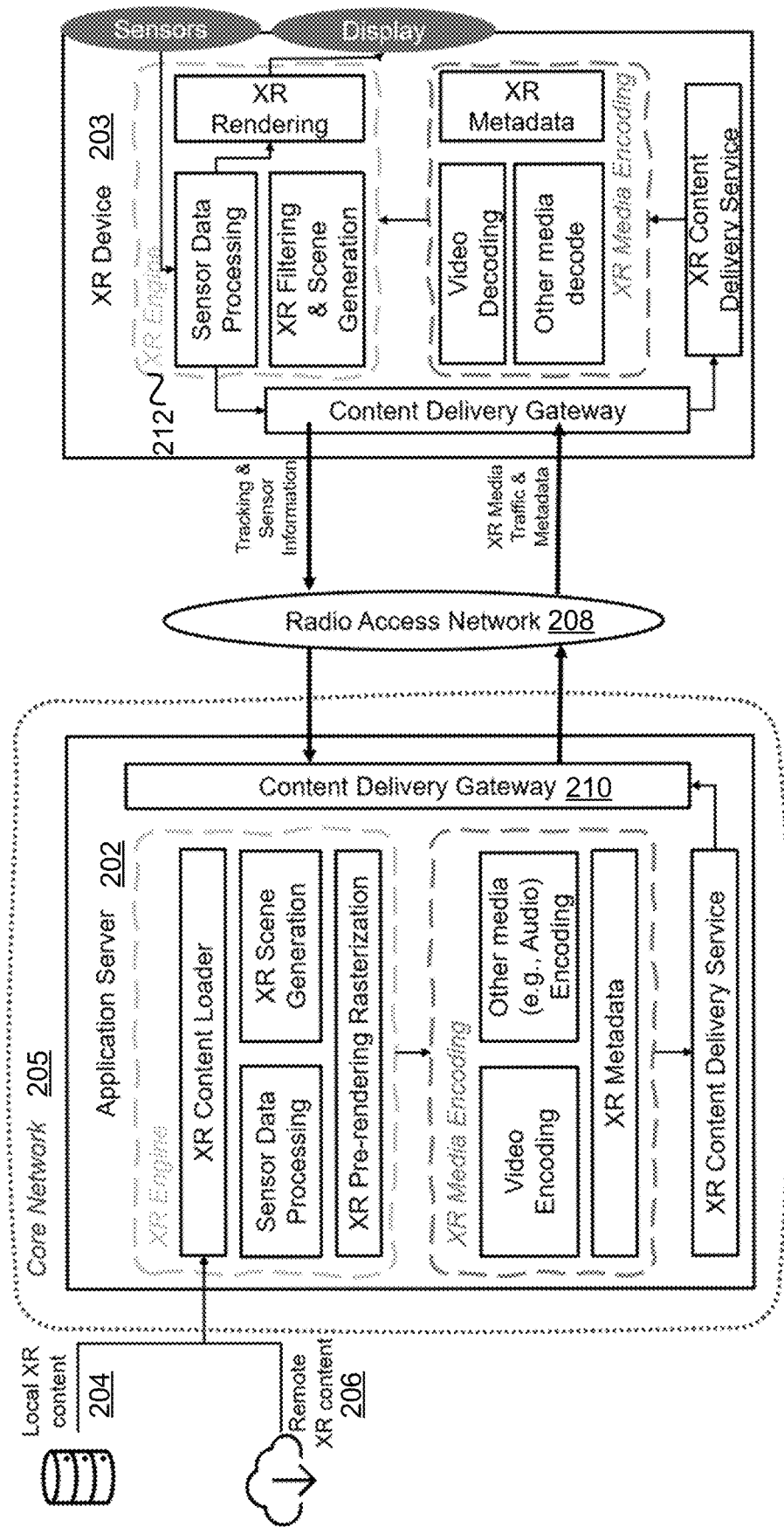
FIG. 2 depicts a split-rendering architecture for mobile networks based on an edge/cloud video application server and an XR UE device.

FIG. 2 depicts a split-rendering architecture for mobile networks based on an edge/cloud video application server and an XR UE device 203. The device 203 is connected to a radio access network 208, which is in turn connected to the application server 202 via a core network 205. The application server 202 may deliver XR media based on local XR processed content or on remote XR processed content. The processing may account for and/or further process tracking and sensing information as uplinked by the XR UE device 203. The application server 202 streams the XR multimedia content via a content delivery gateway 210 to which the XR UE device 203 is connected via any real-time transport protocol. The XR device 203, after decoding the XR content received from the application server 202, may use its XR engine 212 and additional local hardware/software capabilities and/or XR pre-rendered content, and XR associated XR metadata to locally render the XR content on a display.

In the depicted embodiment, the video application server 202 is used therefore to process, encode, transcode, and/or serve local 204 or remote 206 video content pertaining to an AR/XR/CG/tele-operation application session to the XR UE 203. The video application server 202 may, as a result, encode/transcode and control the video viewport content and transmit it in downlink to the RAN 208 based on UE specific parameters, configurations and sensing inputs that may affect the rendering perspective, rate, quality, panning, etc. This general architecture is expected to leverage the advantages of various compute and network domains (e.g., cloud, edge, smart handsets/headsets) to enable scalable AR/XR/CG/tele-operation applications and use cases with low-latency, high rate, and efficient energy usage. The architecture is as such universally applicable both to split rendering with asynchronous time warping devices, e.g., where the video application server encodes a rasterized pre-processed viewport representation to aid the UE, or to split rendering with viewport rendering at the device side, e.g., where the video viewport may be completely or partially rendered at the device side given the media encoded video content and its corresponding metadata available.

In one embodiment, related to video coding domain, the interactivity involving these applications requires guarantees in terms of meeting packet error rate ("PER") and packet delay budget ("PDB") for the QoE of rendering the associated video streams at a UE. The video source jitter and wireless channel stochastic characteristics of mobile communications systems make the former challenging to meet especially for high-rate specific digital video transmissions, e.g., 4K, 3D video, 2×2K eye-buffered video, and/or the like.

In one embodiment, current video source information is encoded based on 2D representations of video content. The encoded elementary stream video content is generally, regardless of the source encoder, organized into two abstraction layers meant to separate the storage and video coding domains, e.g., the NAL, and the video coding layer ("VCL"), respectively. The NAL syntax encapsulates the VCL information and provides abstract containerization mechanisms for in-transit coded streams, e.g., for disk storage/caching/transmission and/or parsing/decoding.

The VCL, on the other hand, encapsulates the video coding procedures of an encoder and compresses the source encoded video information based on some entropy coding method, e.g., context-adaptive binary arithmetic encoding ("CABAC"), context-adaptive variable-length coding ("CAVLC"), and/or the like. A simplified description of the VCL procedures to generically encode video content is as follows: a picture 302 in a video sequence is partitioned 304 into coding units (e.g., macroblocks, coding tree units or variations thereof) of a configured size. The coding units may be subsequently split under some tree partitioning structures (see ITU-T Series H: Audiovisual and Multimedia Systems: Infrastructure of Audiovisual Services—Coding of Moving video. Advanced Video Coding for Generic Audiovisual Services (H.264) (v08/2021); ITU-T Series H: Audiovisual and Multimedia Systems: Infrastructure of Audiovisual Services—Coding of Moving video. High Efficiency Video Coding (H.265) (v08/2021); ITU-T Series H: Audiovisual and Multimedia Systems: Infrastructure of Audiovisual Services—Coding of Moving video. Versatile Video Coding (H.266) (v08/2020)), e.g., binary/ternary/quaternary trees, or under some predetermined geometrically motivated 2D segmentation patterns (see de Rivaz, P., & Haughton, J. (2018). AV1 Bitstream & Decoding Process Specification. The Alliance for Open Media, 182, available at https://aomediacodec.github.io/av1-spec/av1-spec.pdf), e.g., the 10-way split.

In one embodiment, encoders use visual references among such coding units to encode picture content in a differential manner based on residuals. The residuals are determined given the prediction modes associated with the reconstruction of information. Two modes of prediction are universally available as intra-prediction 306 (shortly referred to as intra as well) or inter-prediction 308 (or inter in short form). The intra mode is based on deriving and predicting residuals based on other coding units' contents within the current picture, e.g., by computing residuals of current coding units given their adjacent coding units coded content. The inter mode is based, on the other hand, on deriving and predicting residuals based on coding units' contents from other pictures, e.g., by computing residuals of current coding units given their adjacent coded pictures content.

The residuals are then further transformed for compression using some multi-dimensional (2D/3D) spatial multi-modal transform 310, e.g., frequency-based, or wavelet-based linear transform, to extract the most prominent frequency components of the coding units' residuals. The insignificant high-frequency contributions of residuals are dropped, and the floating-point transformed representation of remaining residuals is further quantized 312 based on some parametric quantization procedure down to a selected number of bits per sample, e.g., 8/10/12 bits. Lastly, the transformed and quantized residuals and their associated motion vectors to their prediction references either in intra or inter mode are encoded using an entropy encoding mechanism to compress the information based on the stochastic distribution of the source bit content. The output of this operation is a bitstream 316 of the coded residual content of the VCL. A simplified generic diagram of the blocks of a modern hybrid (applying both temporal and spatial compression via intra-/inter-prediction) video codec is displayed in FIG. 3.

Figure 3:
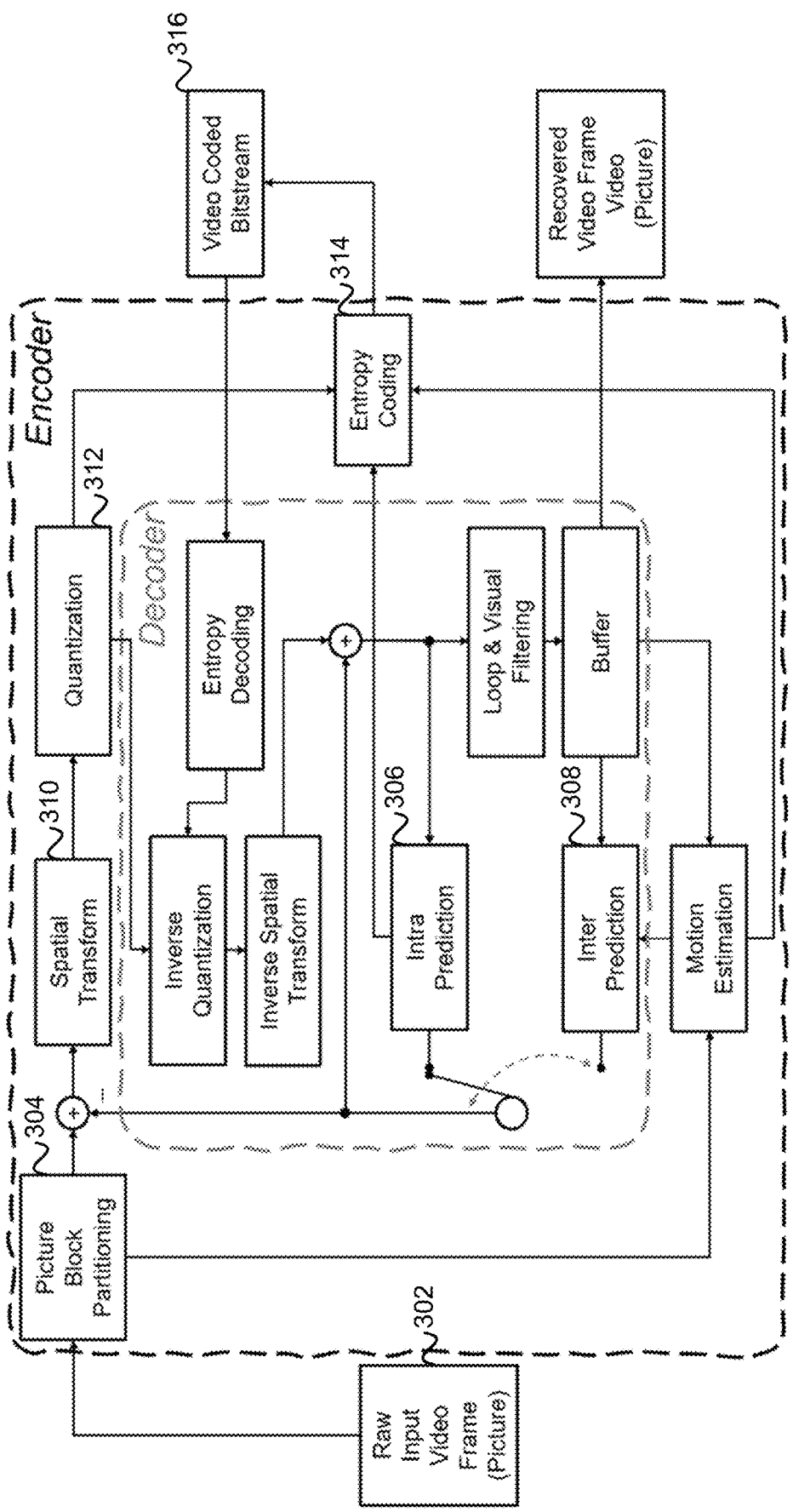
FIG. 3 depicts a simplified block diagram of a generic video codec performing both spatial and temporal (motion) compression of a video source.

FIG. 3 depicts a generic video codec performing both spatial and temporal (motion) compression of a video source. The encoder blocks are captured within the "Encoder" tagged domain. The decoder blocks are captured within the "Decoder" tagged light gray domain. One skilled in the art may associate the generic diagram from above describing a hybrid codec with a plethora of state-of-the-art video codecs, such as, but not limited to, MPEG-1, MPEG-2, MPEG-4 (generically referred to as MPEG-x), H.264, H.265, H.266 (generically referred to as H.26x) or VP8/VP9/AV1. As such, the concepts hereby utilized shall be considered in a general sense, unless otherwise specifically clarified and reduced in scope to some codec embodiment hereafter.

The coded residual bitstream is then encapsulated into an elementary stream as NAL units ready for storage or transmission over a network. The NAL units are the main syntax elements of a video codec and these may encapsulate encoded video metadata, e.g., video/sequence/picture parameter set ("VPS"/"SPS"/"PPS"), supplemental enhancement information ("SEI") messages etc., and encoded video headers and residuals data, generically as picture slices (partitions of a picture, or equivalently, of a video frame). The encapsulation general syntax carries information described by codec specific semantics meant to determine the usage of metadata and video encoded data and aid the decoding process.

The NAL units' encapsulation syntax is composed of a header portion determining the beginning of a NAL unit and the type thereof, and a raw byte payload sequence containing the NAL unit relevant information. The NAL unit payload may subsequently be formed of a payload syntax or a payload specific header and an associated payload specific syntax. A critical subset of NAL units is formed of parameter sets, e.g., VPS, SPS, PPS, SEI messages and configuration NAL units (also known generically as non-VCL NAL units), and picture slice NAL units containing video encoded data as VCL information. An effective decoder may:
  implement a bitstream parser extracting the necessary metadata information and VCL associated metadata from the NAL unit sequence;
  decode the VCL residual coded data sequence to its transformed and quantized values;
  apply the inverse linear transform and recover the residual significant content;
  perform intra or inter prediction to reconstruct each coding unit luminance and chromatic representation;
  apply additional filtering and error concealment procedures; and
  reproduce the raw picture sequence representation as video playback.

These operations and procedures may happen successively, as listed, or out-of-order depending on a decoder specific implementation.

Current RAN implementations do not consider any knowledge of the application data payloads they are required to serve. This level of intelligence may, however, be necessary in handling AR/XR/CG/tele-operation traffic involving multiple streams that may require different QoS flows with heterogeneous yet almost deterministic rate, latency, and reliability requirements for a satisfactory QoE delivery. Discussions regarding a video-codec and application awareness at the level of (fifth generation) 5G RAN have been triggered (see S4-211210: [FS_XRTraffic]: Permanent document, v0.8.0, Rapporteur Qualcomm Inc., (2021)) where the Group of Pictures ("GoP") and prediction types (e.g., intra-/inter-prediction) are currently considered as main features to determine the relevance of a video coded slice (as a partition of a picture/frame) at the RAN level. By definition, a GoP represents a temporal sequence of video frames starting (or ending) with an intra-coded video frame (an I-frame) followed by plurality of forward predicted frames (P-frames) or bi-directional predicted frames (B-frames). A group of pictures parameter set is further described by its associated VPS NAL unit (containing video layer attributes characterization and encoder configuration), SPS NAL unit (containing sequence-level attributes characterization and encoder configuration), and PPS NAL unit (containing picture-level attributes characterization and encoder configuration).

Concretely, the GoP-oriented importance of a slice as a video frame partition is based on whether the slice contains elements that are intra-coded (an I-slice) or are inter-coded (a P-slice for slices with some inter-coded coding units referencing prior references, or a B-slice for slices with inter-coded coding units bi-directionally referencing prior and posterior references within the video sequence), and on the offset to the last intra-coded picture within the current GoP given a periodic GoP encoding configuration. As such, if the slice is an I-slice and belongs to the current intra-coded picture it is of highest importance, whereas the importance decreases linearly to 1 as the slice may be a P/B-slice and belongs to an inter-coded picture further away from the last intra-coded picture. This mechanism may overly simplify some aspects of video coding and visual perception by equally weighting coding units and subsequent regions of a picture to their lowest importance given common video codec specifications, as highlighted briefly in Table 1.

Consequently, if a slice contains both intra- and inter-coded coding units, it will be down-prioritized from an importance perspective even though it may contain a higher significant portion of intra-coded components which are more relevant than the inter-coded ones.

TABLE 1

Slice type and generic characterization with respect to intra-/inter-prediction type according to common video codecs

| Slice type | Meaning and content | Generic importance | Rate-distortion behavior |
| --- | --- | --- | --- |
| I-Slice | May contain only intra-coded coding units | High | High rate, loss severely distorts current picture and video coded sequence set referencing this slice |
| P-Slice | May contain only intra-coded and predictive inter-coded coding units | Medium | Low-medium rate, loss may distort to some degree the current picture and may affect video coded sequence set referencing this slice |

TABLE 1-continued

Slice type and generic characterization with respect to intra-/
inter-prediction type according to common video codecs

| Slice type | Meaning and content | Generic importance | Rate-distortion behavior |
| --- | --- | --- | --- |
| B-Slice | May contain intra coded and predictive/bi-predictive inter-coded coding units | Low | Low rate, loss might distort the current picture and might affect video coded sequence set referencing this slice |

In one embodiment, related to layer-based streaming and dynamic control, as video codecs are designed to compress the video information source under a rate-distortion trade-off constraint, their encoding is not specifically targeted for lossy mobile wireless communications, which affect the encoded bits transfer at random given the characteristics of the wireless channel. Often dynamic adaptation of video source encoding based on channel statistics involves high feedback loop delays given the multiple network hops separating the video source and RAN, or equivalently, a video decoder at a receiver. Scalable enhancements of video codecs (at the expense of increased encode/decode complexity) is achieved by layered encoding with spatial and/or temporal video coding layers.

As a result, the encoded video content may be incrementally encoded/transmitted/decoded given some hierarchical relationship between the video layers (e.g., a base video layer, an enhancement layer #1, an enhancement layer #2 etc.). Such encoding/decoding procedures have been developed either as extensions of existent codec families, e.g., H.264, or otherwise in-built in new generation codecs such as H.265, H.266. This scalable layered approach together with the bandwidth ("BW") occupied by each individual layer offer the possibility of dynamic streaming adaptation of a video source rate outside of the video encoder domain, applicable in practice.

Regarding 3GPP RAN overview and E2E XR (Video) transport architecture, in 5G NR RAN, as well as in previous releases of 3GPP, the RAN lower layers have no specific knowledge of the upper layer traffic, acting as a Data Radio Bearer ("DRB") over the physical wireless channels between a CN/data network and an UE. As such, no optimized decision can be taken in appropriately scheduling associated traffic and controlling the rates of various application streams for transmissions with high granularity and low-delay adaptability constraints required by highly mobile environments.

Interactive multimedia applications such as AR/VR/XR involving high-rate and low-latency constraints for transmission of video coded data synchronized to some user interaction is such a specific use case with a high QoE requirement. To serve alike applications reliably and robustly, a RAN may benefit from metadata and actionable insights into the AR/VR/XR video traffic required to transfer over the air.

Figure 4:
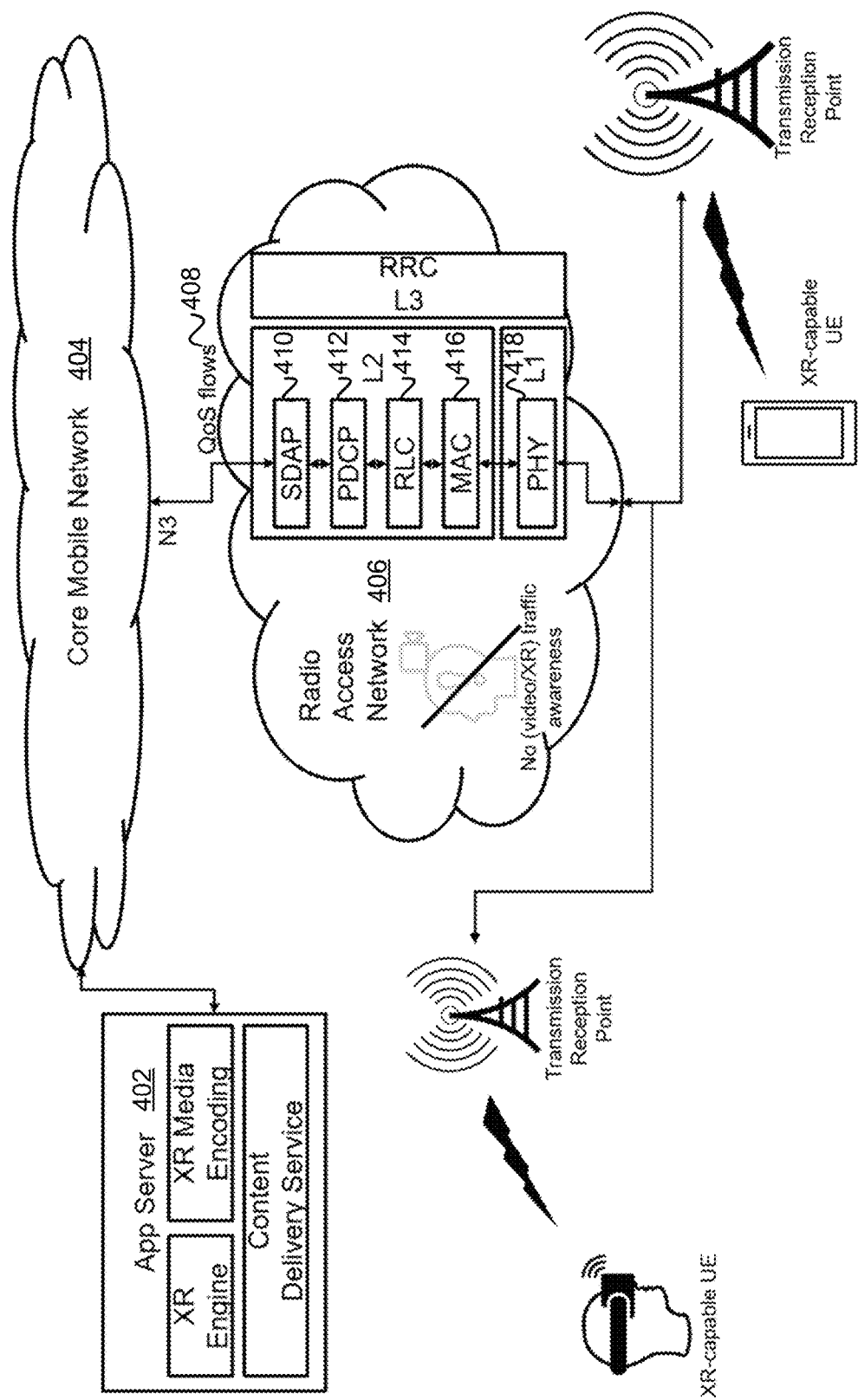
FIG. 4 depicts one embodiment of a communications systems architecture overview.

Certain embodiments, however, do not offer such capabilities and procedures. As illustrated in FIG. 4, the protocol data units ("PDUs") associated with an XR application session of an application server 402 connected to a CN 404 is transferred via the CN 404 UPF over the Internet Protocol ("IP") to the RAN 406. The multimedia traffic may be further supported by a real-time multimedia transport protocol such as a Real-time Transport Protocol ("RTP") or alike to handle jitter, packet loss and out-of-order deliveries that may occur within a typical IP network setup.

The QoS associated with IP packets of the XR traffic is handled by the CN 404 via QoS flows 408 generated at the UPF within the established PDU session. This procedure is opaque to the RAN 406, which only manages the mapping of QoS flows 408 associated with the received IP packets to their corresponding DRBs given the QoS profile associated with the indicators of each QoS flow 408. In a 5GS for instance the QoS flows 408 will be characterized by the 5QI (see 3GPP Technical Specification TS 23.501 (V17.2.0—September 2021). System architecture for the 5G System (5GS); Stage 2 (Release 17)).

This latter mapping of QoS flows 408 to DRBs is performed within the RAN 406 by the Service Data Adaptation Protocol ("SDAP") layer 410. The SDAP Service Data Unit ("SDU") is then processed by the Packet Data Convergence Protocol ("PDCP") 412 where among others header compression and ciphering are performed and the outputs further processed by the Radio Link Control ("RLC") 414. The RLC 414 may perform segmentation of the PDCP 412 SDUs and implements the automatic request response ("ARP") repetition retransmissions. The RLC 414 SDUs are then processed over the logical channels interfaces by the Medium Access Control ("MAC") layer 416, which handles the logical channels multiplexing, hybrid automatic repeat request ("HARQ"), scheduling and scheduling retransmission functions. Lastly, the MAC SDUs are combined over the transport channel into transport blocks ("TBs") at the level of Physical ("PHY") layer 418. The TBs are partitioned into same-sized coding blocks ("CBs"), which are forward error correction ("FEC") encoded by the PHY. The PHY handles thus coding/decoding, rate matching, modulation/demodulation, multiantenna mapping and other typical radio PHY layer functions.

Consequently, any dynamic adaptation required at the RAN level to satisfy QoS flow requirements is constrained just to meeting a hard threshold in terms of statistical PER, PDB, or guaranteed bit rate ("GBR") without any prior information of the content/importance of data transmitted. As already outlined, for multimedia video traffic not all packets/data segments (e.g., video frames/slices) are of equal importance, and even not all bits are equal in achieving a satisfactory level of QoE for an end user. For a reliable, robust, and user-oriented immersive video experience, it would therefore be of interest for the RAN lower layers transmission strategies to exploit the syntax and semantics of video codecs to determine a quantitative importance of the video encoded data transmitted at any point in time and support RAN adaptive protocols for scheduling and transmissions configuration.

In general, the subject matter herein presents solutions for determining the importance of video codec elementary stream data units based on stream syntax parsing, semantic extraction of information and processing of extracted information by an abstract graphical directed information flow model. The model may apply rule-based quantitative functions or statistical learning optimized functions to determine the importance of video codec data units, which subsequently may be used to annotate/tag/decorate the video coded stream application data units ("ADUs") for extended and optimized processing by the network, e.g., RAN awareness and adaptation to video coded traffic.

Figure 5:
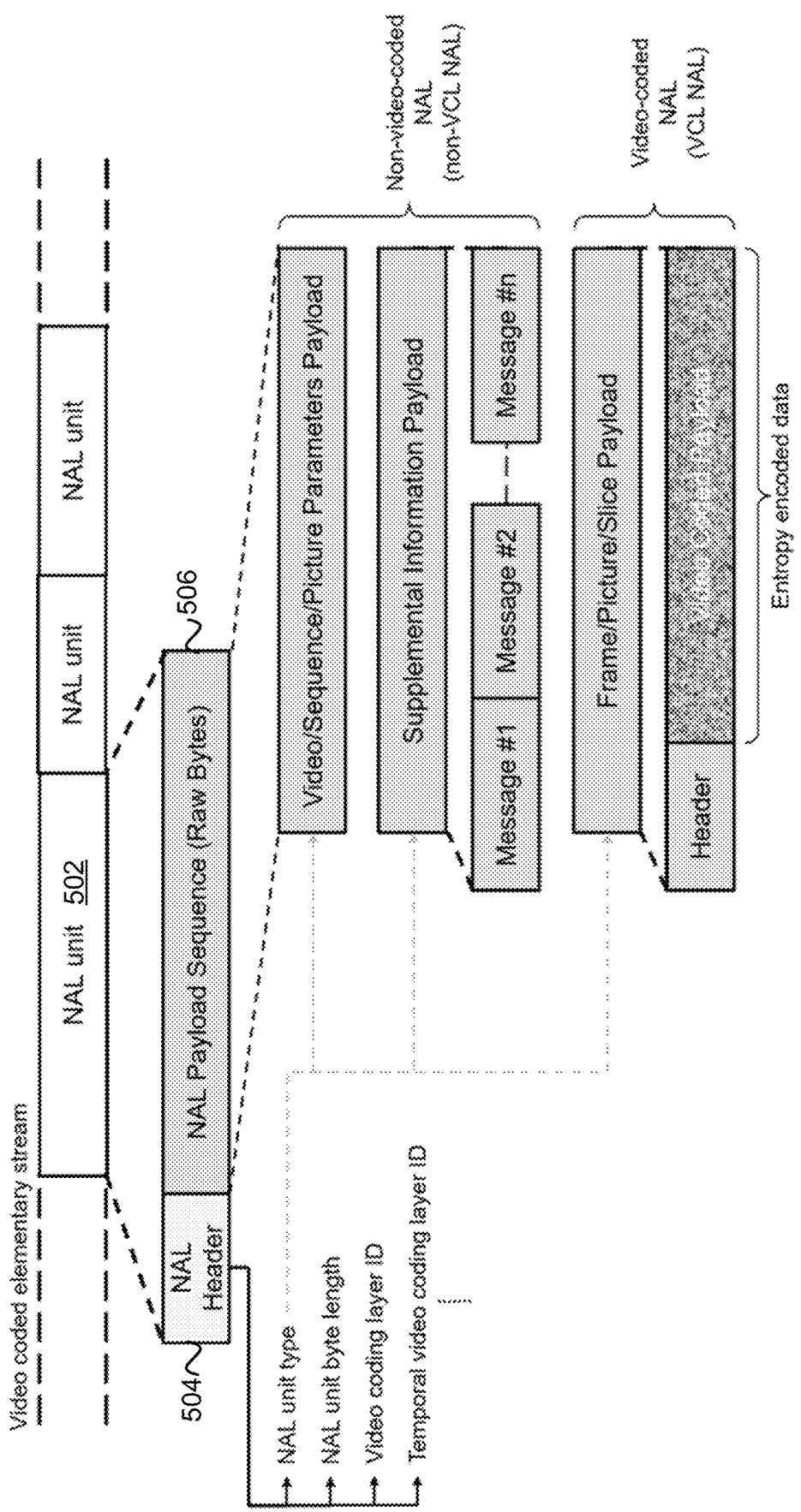
FIG. 5 depicts a video coded elementary stream and its partitioning in a plurality of NAL units.

In one embodiment, encoded video content is encapsulated, e.g., according to H.26x standards, into a storage/transport abstraction layer, e.g., the NAL. The NAL partitions an elementary video stream into NAL units 502 as fundamental units of storage of the video encoded content that are either to be stored to a disk or transmitted over a packet-based network. A NAL unit 502 is further partitioned into a header portion 504 as NAL prefix and a NAL payload 506 containing raw uncoded (VPS/SPS/PPS/SEI) or coded (slice/slice segments) byte information. The NAL unit header 504 is formed of a delimiter to identify the NAL unit start position, as well as information about the contents of the NAL unit payload, e.g., NAL unit type, NAL byte length, video coding layer/temporal layer identifier, as highlighted in FIG. 5, which depicts a video coded elementary stream and its partitioning in a plurality of NAL units. The NAL units are formed of a header and a payload, containing information about the type, size, and video coding attributes and parameters of the NAL unit data enclosed information.

More information about the NAL unit content may be gathered based on the NAL unit type by parsing the NAL unit payload 506 and by interpreting specific semantics of payload headers 504 and non-entropy video encoded data. This procedure can be performed in real-time with linear complexity and low latency overhead over specialized hardware embodiments or software implementations. Extracting this information, a feature set of attributes semantically describing a NAL unit 502 from the perspective of the video codec may be formed to categorize/estimate/infer/predict the importance of NAL units 502 for the coded video elementary stream playback. This procedure of categorization/estimation/inference/prediction may be performed in some embodiments by policy-based methods (e.g., expert- or model-based systems) or in other embodiments by learning-based methods. The outcome of such methods, e.g., the importance indicator of a NAL unit 502 from the perspective of the video codec itself, may be leveraged at the network and control layers to better schedule and transport high-rate, low-latency video encoded traffic associated with immersive AR/VR/XR applications over mobile CNs and RANs.

For example, conventionally, an NR RAN level does not exhibit any intrinsic knowledge of awareness of the traffic being served, as illustrated in FIG. 4, which depicts a communications systems architecture overview. The figure includes the source application server connected (possibly at the edge) to a core mobile network which in terms is connected to a radio access network serving subscribed and connected user equipment. As such, the RAN configuration, scheduling, and transmissions relies on QoS flows and their mappings to DRBs configurations as signaled by the UPF in the CN. The QoS flows and their associated QoS profile target PER, PDB, or GBR values ensure appropriate configuration of the RAN lower levels, yet this contract between the CN and RAN does not include any finer granularity indicators about the traffic content being enclosed within the QoS flows to aid the RAN meet statistically its contractual agreements at the QoS profile level.

This problem is especially challenging for the high rate, low latency, video encoded XR traffic with noisy periodicity due to inherent source and network jitter since the RAN may require additional knowledge of the data to transfer over the air for better decision making in scheduling and transmissions/retransmissions to meet the target PER, PDB, and GBR figures. This knowledge represents the RAN-awareness to video encoded content and its relevance to the end-user QoE. Equipped with such awareness, a RAN may decide better how to prioritize traffic, adapt dynamically its configuration, rate, and FEC to reach the target PER, PDB, and GBR.

In a first embodiment, to categorize, estimate, infer, predict, and/or the like the importance of NAL units for the coded video elementary stream playback within the coded data domain, the elementary stream needs to be parsed and interpreted according to the corresponding codec information derived or available at hand through various side metadata, e.g., RTP header information, service level metadata information, and/or the like. To achieve this within an embodiment, the corresponding processing required needs to perform a combination of the following steps: NAL unit detection, NAL unit header parsing, NAL unit type identification and filtering, NAL unit payload metadata processing and semantic extraction based on video codec information, and extraction and selection of feature sets prospectively describing the importance of the NAL unit within the video coded elementary stream. The main procedures described may be performed in part or fully, either in the described sequence, in parallel, or in an alternative sequence specific to a particular embodiment.

Figure 6:
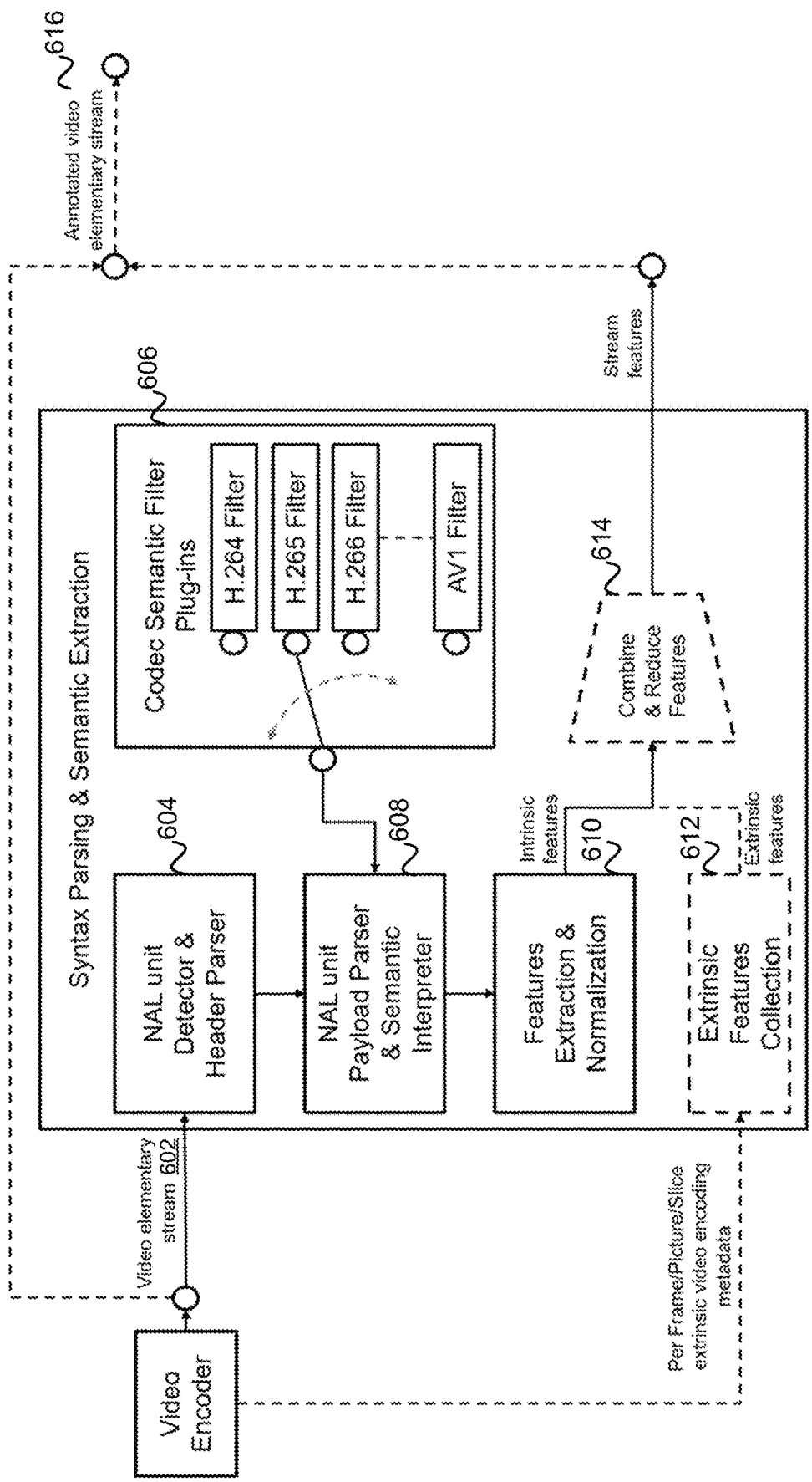
FIG. 6 depicts a block diagram of the syntax parsing and semantic extraction of information from a video encoded elementary stream.

A block diagram of the described processing embodiment is illustrated in FIG. 6. FIG. 6 depicts the syntax parsing and semantic extraction of information from a video encoded elementary stream. The dashed lines represent optional processing paths according to various embodiments as described in more details in the detailed description below. An elementary video coded stream 602 is segmented into NAL units by the NAL unit detector and header parser 604. The information extracted at this stage may be a combination of a NAL unit type, and at least one of a NAL unit byte length, a video coding layer identifier assigning the enclosed NAL unit to a particular video coding layer (e.g., a base layer (id=0), an enhancement layer (id>0)), a temporal video coding layer assigning the NAL unit to a particular video temporal coding layer (e.g., a base temporal layer @30 fps (tid=0), an enhancement temporal layer @60 fps (tid=1), a secondary enhancement temporal layer @90 fps (tid=2)).

Given an identified NAL unit type, further conditional processing may be performed based on codec semantics specifications. As such, codec-specific semantic filters 606 are applied to further parse the NAL unit payload information, e.g., at the NAL Unit Payload Parser & Semantic Interpreter 608, according to the corresponding NAL unit types. An embodiment shall consider at least a subset of the following NAL unit types for further semantic filtering and processing: video/sequence/picture parameters (e.g., NAL VPS/SPS/PPS), video picture/frame/slice video coded payloads (e.g., a NAL slice/slice segment in H.26x), and/or supplemental metadata information (e.g., NAL SEI payloads).

Based on the quality and the codec specific knowledge representation (e.g., specification semantics depth) of the available video codec semantic filters, in some embodiments the NAL unit payloads are further processed, parsed, and interpreted outside of the entropy coding domain (e.g., CABAC, CAVLC or equivalent). As such, the metadata bit/byte encoded information in signed format, unsigned format, or custom tabularized formats (e.g., Exp-Golomb 0-th/1-st order coding or equivalent) is parsed 610 and its semantic content is extracted into a plurality of features. Such features may contain a non-restrictive combination (e.g., the features provided as examples are not only combinations to be considered but represent an informative subset thereof) of layer-mapped (e.g., linked to a particular video layer/temporal layer identifier) or non-layer-mapped (e.g., not linked to a particular video layer/temporal layer identifier in case the layer information is not necessary or is clear from the context—e.g., single layer stream) NAL unit type specific parameters. For instance, in one embodiment, the following parameter semantics may be interpreted and transformed into features:

Video parameters:
  Video coding layers information of current video coded sequence (if available)
  Recommended frames-per-second playback count (if available)
  Additional metadata applicable to parsing/interpreting sequence parameters (as per video codec specification)
Sequence parameters:
  Width pixel count (resolution width)
  Height pixel count (resolution height)
  Video coding block size (determines number of coded rows and columns in the picture)
  Number of maximum reference pictures in the buffer for inter-coded mode
  Additional metadata applicable to parsing/interpreting picture parameters (as per video codec specification)
Picture parameters:
  Tile based encoding mode configuration flag (determines whether a sequence of pictures is split into rectangular tiles whereby video coding is applied)
  Row encoding mode configuration flag (determines whether within a slice the video coding units are indexed row-wise)
  Picture segmentation information into picture partitions (determines picture partitions within tiles—for tile based encoding mode—as well as within slices—for both tile based encoding and row based encoding modes)
  Additional metadata applicable to parsing/interpreting slice parameters (as per video codec specification)
Slice parameters:
  Slice type (including subtype, if any)
  Slice video coded content size
  Slice position in the picture/frame/tile
  Slice number of rows
  Slice video coding units' sizes in bytes per each row of the slice
  Slice references lists (one list for P-slices, two lists for B-slices containing the indices of the slice references the current slice motion inter-prediction is based upon)

Upon transformation of the plurality of parameters into features, some embodiments may numerically encode, combine, and/or normalize the latter for annotations of the video elementary stream (generate an annotated video elementary stream 616) and/or for universal further processing purposes.

In some embodiments, the intrinsic information contained within the header metadata information of NAL units and/or NAL units' payloads may be complemented and enhanced with metadata information traces produced by a source video encoder/XR media encoding function. The video encoder may provide extrinsic information given its video encoding outputs on a per frame, picture, slice, and/or the like basis. In one embodiment such supplemental metadata may consist of at least one of frame-, picture-, and/or slice-level information related to the GoP configuration (which may be configured semi-statically between a minimum and a maximum length and allow the encoder to decide on the GoP length on-the-fly given the scene cuts it may detect while trying to perform compression of P/B-frames), to statistics of peak signal-to-noise ratio ("PSNR") of the encoded video coding blocks (either aggregated per luminance/chroma encodings or globally per frame/picture/slice), to the statistics of each encoding mode (e.g., intra-/inter-encoding, skip encoding etc.) of the video coding blocks used (either aggregated per row of a frame/slice or per frame/picture/slice), to the statistics of prediction and transform units sizes of the video coding blocks etc.

Therefore, this additional extrinsic video metadata information may act in some embodiments as a supplement of the intrinsic information available in the non-entropy encoded portions of the elementary video stream. A synchronized mixer may, in one embodiment, combine and reduce the intrinsic and extrinsic information to a singular feature set. An instance of such an embodiment is outlined via the dashed processing blocks, e.g., "Extrinsic Feature Collection" 612, and "Combine and Reduce Features" 614, shown in FIG. 6.

In a second embodiment, the universally extracted stream features, either as standalone or as annotations of the video elementary stream, may subsequently be used by other processing blocks and logic filters to categorize, infer, predict, estimate, and/or the like the importance of the individual NAL units for the playback quality of the video encoded stream. The features, having been extracted given the NAL unit syntax parsing and semantic filtering of the NAL unit headers and various payloads, are already synced with the NAL unit contents. As such, incremental processing blocks may take advantage of video codec generic hierarchical designs and compression procedures, as highlighted in FIG. 3, to exploit such structures jointly within the available feature set and its associated information.

For instance, some embodiments may consider the hierarchical and encapsulation relations among the abstract video coding components of modern hybrid video codecs. A video encoded elementary stream may thus be formed of one or more hierarchically encoded (either spatial or temporal) video layers. In turn each video layer is formed of a plurality of video coded sequences out of which only one sequence, e.g., the current GoP, is presented at any given time.

Figure 7:
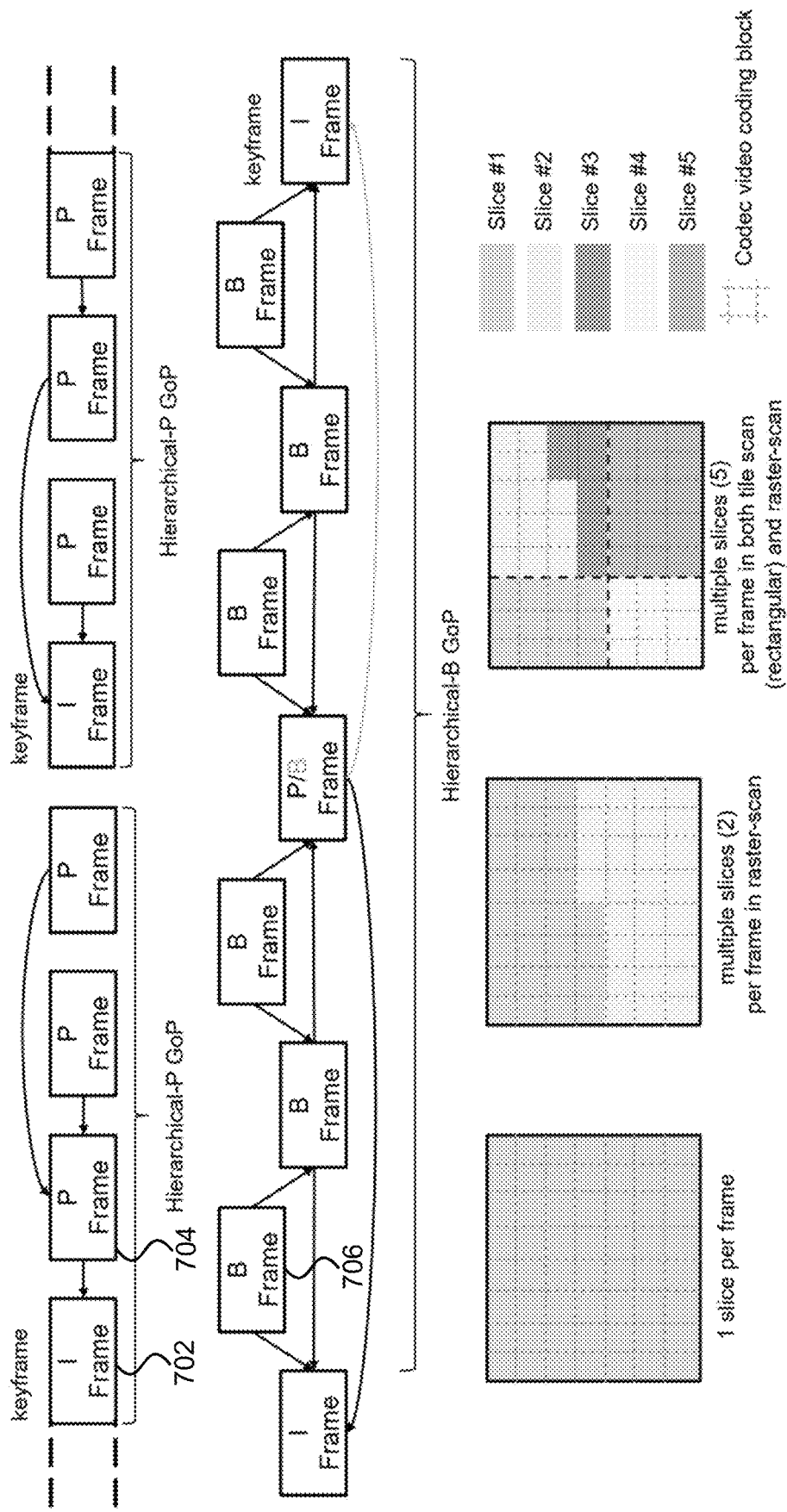
FIG. 7 depicts a Hierarchical-P GoP structure, a Hierarchical-B GoP structure, and various generic frame to slice partitions.

FIG. 7 depicts a Hierarchical-P GoP structure, a Hierarchical-B GoP structure, and various generic frame to slice partitions. Arrows indicate dependency of video/motion information enclosed within a frame (e.g., P/B-frame) to the video/motion information enclosed within its corresponding reference frame(s) (e.g., I/P/B-frame(s)). As shown in FIG. 7, a GoP is further formed of one or more moving pictures, e.g., frames, out of which the first frame is in some embodiments an intra-coded frame without any references followed by a plurality of inter-coded frames, with references to other frames, such as I-frame(s) 702 and P-frame(s) 704. Typical arrangements of GoP associated with network streaming applications are the low-latency encoding/decoding Hierarchical-P GoP (where an I-frame 702 is followed by a plurality of P-frames 704, usually up to mod 4=3 number of P-frames 704) and low-rate Hierarchical-B GoP (where an I-frame 702 reference is followed by at least one B-pyramid formed of 3 B-frames 706 which in turn is followed by an end I-frame 702). These two typical GoP arrangements are illustrated in FIG. 7.

Lastly, each individual frame, may be further segmented into one or more partitions, e.g., as slices. The slices may be geometrically organized in typical row-oriented raster-scans or in rectangular tile scans spanning either row set portions or subpicture rectangular portions of a frame and correspondingly enclosed video coding units/blocks. Slices exhibit as previously outlined (see Table 1) their own type (I/P/B determining simultaneously also the global type of their containing frame) based on the video coded coding units/blocks they enclose. Some types of frame to slice partitions are displayed for illustrative reference within FIG. 7.

In some embodiments, the information contained in the extracted feature set and the hierarchical and encapsulation structure of the modern hybrid video codecs may be exploited as a graphical directed information flow model. The graphical directed information flow model represents thus the flow of information contained in the feature set according to the video encoding specification by integrating the directed hierarchical and encapsulation structure of the video codec main components (e.g., within a particular embodiment, video layers (temporal or spatial), video sequences, picture/frames, slices may be considered) into the information flow model.

The corresponding directed flows in the model outline therefore how information of higher levels/parent nodes affects the subsequent lower levels/child nodes information content. This abstract graphical model in turn allows the application of various information-to-importance kernel mappings, $d_I^{(\ell)}$ $(\cdot; \theta^{(\ell,i)})$, with $\theta^{(\ell,i)}$ representing a subset of the extracted features representing the available information content specific to the $\ell$-th level, i-th node, for the aggregation of importance of different NAL unit types (mappable to levels and nodes in the proposed structure).

Figure 8:
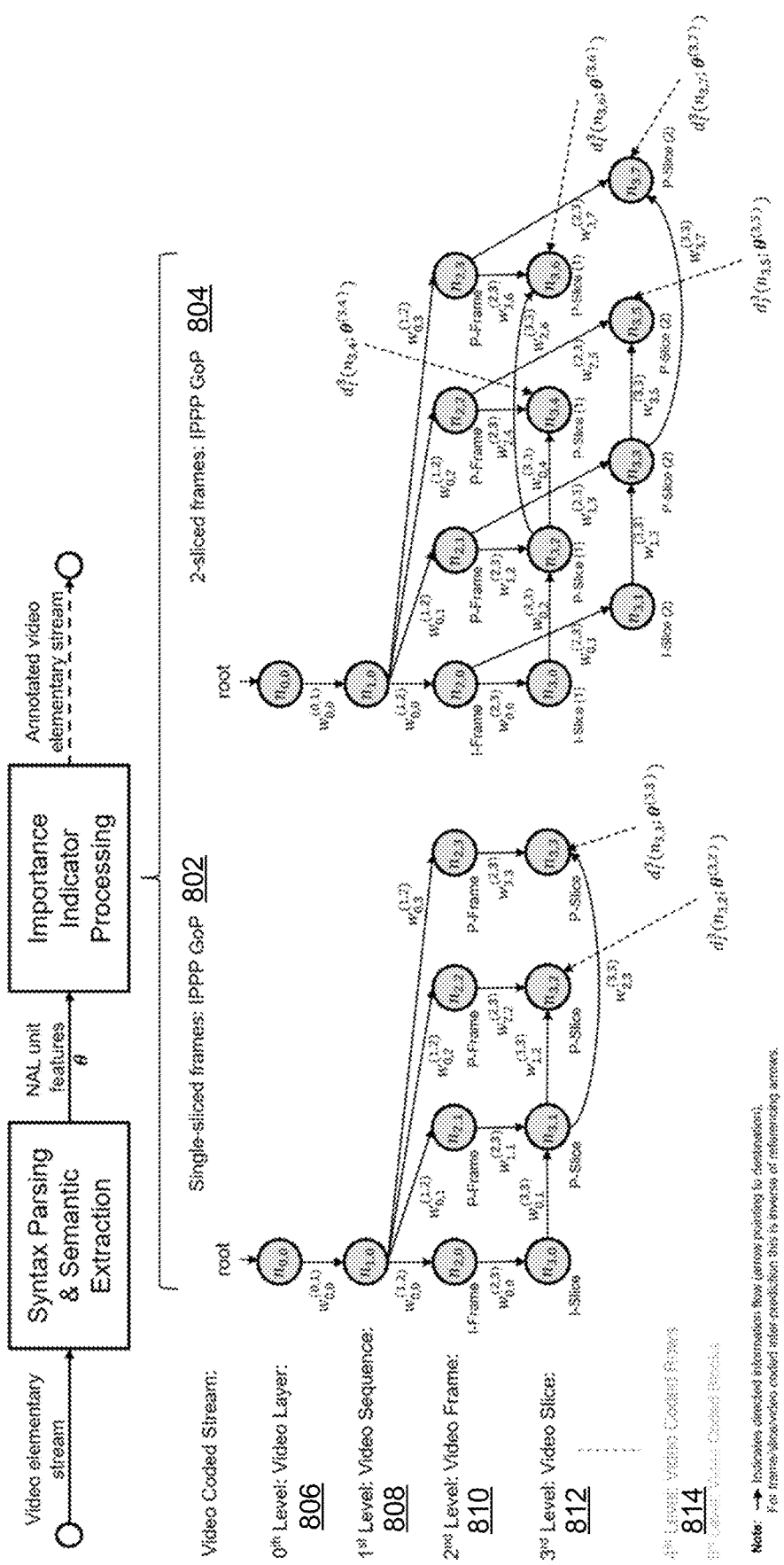
FIG. 8 depicts a graphical model of directed information flow for the NAL units of a hybrid modern video coded elementary stream with a hierarchical multilevel structure including the video layer level, sequence layer level, video frame level, video slice level, whilst exploiting the interrelations and references of video coded data at the slice level for determination of NAL units' individual importance without decoding.

Two embodiments of a graphical directed information flow for a video coded elementary stream (a 1-sliced I-P-P-P frame GoP 802, and respectively, a 2-sliced I-P-P-P frame GoP 804) are presented in FIG. 8. FIG. 8 depicts a graphical model of directed information flow for the NAL units of a hybrid modern video coded elementary stream with a hierarchical multilevel structure including the video layer level, sequence layer level, video frame level, video slice level, whilst exploiting the interrelations and references of video coded data at the slice level for determination of NAL units' individual importance without decoding. One skilled in the art may extend the displayed connections therein from the slice level to sub-slice level for an even finer granularity at the expense of model complexity.

The graphical models in FIG. 8 outline the information flow given both the data encapsulation and temporal relations of video coded pictures, and based on these, present an abstract model-driven methodology to categorize, infer, predict, estimate, and/or the like, the importance of video coded NAL units (mappable to specific nodes in the graph) without performing video decoding. The latter goes beyond conventional methods, which determine importance of pictures and associated frames based on video content and, inherently, require video content analysis and decoding. Furthermore, the proposed graphical model of the directed information flow method allows for policy-based functions and/or statistical learning kernels for information-to-importance mappings to be embedded on top for a complete quantitative description as described in the sequel.

In the graphical directed information flow model structure, as informatively depicted in FIG. 8, the top-level information (e.g., $0^{th}$ level 806) is accumulated by features pertaining to an entire video coded layer, which, as seen in previous embodiments, may be collected either directly by interpreting the semantics of the NAL unit headers or of the non-VCL NAL video parameter set units. A subsequent level (e.g., $1^{st}$ level 808) is formed by information of features pertaining to a sequence of video coded pictures, like the information content extracted from the NAL unit headers or from the non-VCL NAL sequence and picture parameter set units.

Another level (e.g., $2^{nd}$ level 810) represents information extracted from features of individual frames within a given video coded sequence (e.g., in a GoP), as for instance the information content parsed and semantically extracted from the NAL unit headers of frames and/or their associated slices. In some embodiments a final level (e.g., $3^{rd}$ level 812) is formed of slice specific information which can be obtained from extracted features out of the NAL unit headers of slice type, and respectively, out of the headers of the NAL slice payload. On the other hand, given availability of more features and subsequent information content other embodiments may consider additional levels of information within the graphical directed information models, such as for instance a sub-slice/row-coded/video coding block level (e.g., $4^{th}$ level 814) where statistical information about the coded components within a slice payload may be utilized to derive/compute an importance function for the individual sub-slice/row-coded/video coding blocks components of a slice for finer granularities of the importance indicator of any associated NAL units (e.g., NAL units that present a directed path to the individual sub-slice/row-coded/video coding blocks components additionally considered).

Moreover, as also displayed in FIG. 8, some embodiments fully exploit the graphical directed information model to hierarchically and recursively derive a NAL unit's importance indicator. Consequently, the importance indicator of a node $n_{\ell,i}$ in the graphical model associated with a NAL unit is computed/inferred/predicted/estimated based on its same-level and one lower-level direct dependents such that at any level $\ell$, $0 \leq \ell <L$ within an L-depth model the importance function of $n_{\ell,i}$ is obtained as:

$$d_I^{(\ell)} n_{\ell,i} ) = d_I^{(\ell)} n_{\ell,i+1} \theta^{(\ell,i)} + \Sigma_j w_{i,j}^{(\ell,\ell)} d_I^{(\ell)}$$
$$(n_{\ell,j}) +\Sigma_k w_{i,k}^{(\ell,\ell+1)} d_I^{(\ell+1)} n_{\ell+1,k} ) \quad \text{Eq. 1}$$

where the weights $w_{i,j}^{(\ell,\ell)}$, $w_{i,k}^{(\ell,\ell+1)}$ (where a weight $w_{i,j}^{(l,p)}$ generically denotes the weight associated with a directed edge of information flow from the i-th node at level $\ell$, e.g., $n_{l,i}$, to the j-th node at level p, e.g., $n_{p,j}$) may in one embodiment represent binary indicators (e.g., a "0" value for no directed edge and a "1" value for a directed edge) of a directed information flow.

Based on the Eq. 1 recursive rule, the importance indicator of various NAL units is essentially determined by the information-to-importance function kernel associated with the intrinsic value of information of each node as taken single-handedly based on its features $\theta^{(\ell,i)}$, e.g., $d_I^{(\ell)} n_{\ell,i} ; \theta^{(\ell,i)}$ ). For nodes without children (e.g., nodes i* at the lowest level, L, that have no external outgoing directed edge) the value of this functional kernel is of particular importance since it determines fully the associated importance of upper level connected nodes by means of accumulation according to Eq. 1.

In some embodiments the information-to-importance function $d_I^{(\ell)} n_{\ell,i}\ ;\boldsymbol{\theta}^{(\ell,i)}$ ) may consider the full set of extracted features, e.g. $\boldsymbol{\theta}^{(\ell,i)}$, whilst in other embodiments, where reduced complexity is desired, only a subset thereof may be used. Additionally, in one embodiment the same functional kernel may be considered for all layers, e.g., as layer common $d_1 \cdot (\ \boldsymbol{\theta}^{(\ell,i)}\ )=d_I^{(\ell)} \cdot (\ \boldsymbol{\theta}^{(\ell,i)}\ ),\ \forall \ell$.

In some embodiments the function $d_I^{(\ell)}$ ($n_{l,i}, \boldsymbol{\theta}^{(\ell,i)}$), at the video slice level, may consider the row-coded video content distribution of sizes, the slice type, the slice size, and slice references/referencing information to determine the importance of the associated NAL slice at the $3^{rd}$ level 812 in the graphical directed information model as presented in FIG. 8. As an example, in one embodiment the compression gain can be computed based on the available sequence-level picture resolution information, chroma subsampling type, slice type and slice references with respect to the uncompressed picture/frame/slice rate representation, e.g., $R_{raw}$.

In one embodiment, such an embodiment would consider and quantify the video compression coding gain as an indirectly proportional importance measure according to a rate-distortion function which seeks to minimize the source rate, e.g., the average mutual information between a raw source of information and its compressed representation, under a limited distortion constraint. An example of the latter information-to-importance function would be, in one embodiment, at the picture/frame/slice level, a $$d_I^{(\ell)}(n_{\ell,i}; \theta^{(\ell,i)}) \propto \frac{R_{enc}(D)}{R_{raw}},$$

where $R_{enc}(D)$ is the encoder compressed rate of the video compression objective given a constant visual quality, or equivalently a distortion upper limit $D^*$, such that $D \leq D^*$. This essentially finely quantifies video coded visual importance in non-critical (highly redundant) frame components being highly compressed (high coding gain, e.g., lower $$\left.\frac{R_{enc}(D)}{R_{raw}}\right)$$

in time and space, whereas critical (of high visual information content) frame components being less compressed (lower coding gains than non-critical frames, i.e. higher $$\left.\frac{R_{enc}(D)}{R_{raw}}\right)$$

in time and space, without necessity of decoding the video coded stream. This constant visual quality encoding mode leveraged thereby is mostly the default encoding procedure of modern hybrid video encoders and the preferred encoding strategy for high-quality advanced video media such as immersive AR/VR/XR applications.

In another embodiment the function $d_I^{(\ell)}\ n_{\ell,i}\ ;\theta^{(\ell,i)}$) may simply consider at least one of the slice type and of the slice reference(s)/referencing information to determine the slice position and role within a GoP and subsequently determine/predict/estimate with low-delay its importance in an incremental manner. Following the model described in Eq. 1, for instance, such an embodiment will linearly assign the lowest importance to the slices/associated frames that have no referencing connections, and consequently, the highest importance to the key slices/associated frames that root most of the information enclosed within a GoP (that have most cumulative references across the GoP plane). Such embodiments lead to importance indicators that inverse proportionally match low-latency decoding order encodings of the video coded frames/slices, e.g., the frames/slices with highest importance indicators are first in decoding order, whereas the frames/slices with lowest importance indicators are last in decoding order. As an example, in one embodiment wherein $d_I^{(\ell)}$ ( $n_{\ell,i};\ \theta^{(\ell,i)}$)=1 for any I/P slice, the single-sliced I-P-P-P frame GoP sequence depicted in FIG. 8 will be marked with the importance levels I(4)-P(3)-P(1)-P(1).

Some embodiments may consider specialized realizations of Eq. 1 for upper-levels nodes (e.g., $0^{th}$ level—video layer level 806, $1^{st}$ level—sequence level 808) in which their importance is reduced to a high priority constant, e.g., $d_I^{(\ell)}(n_{\ell,i};\ \theta^{(\ell,i)})=c$ and $w_{i,j}^{(l)}=w_{i,k}^{(l+1)}=0$, $l=\{0,1\}$, $\forall j\neq i, k$. Such specializations of Eq. 1 are meant to simplify processing and acknowledge the fact that the NAL units associated with these levels of information are in fact stream metadata components describing parameters and configuration of the encoder for subsequently enclosed frames within a video coded sequence belonging to a video coded layer. As such, for bitstream compliance purposes such metadata and header related information may always be treated with high importance in some embodiments.

Figure 9:
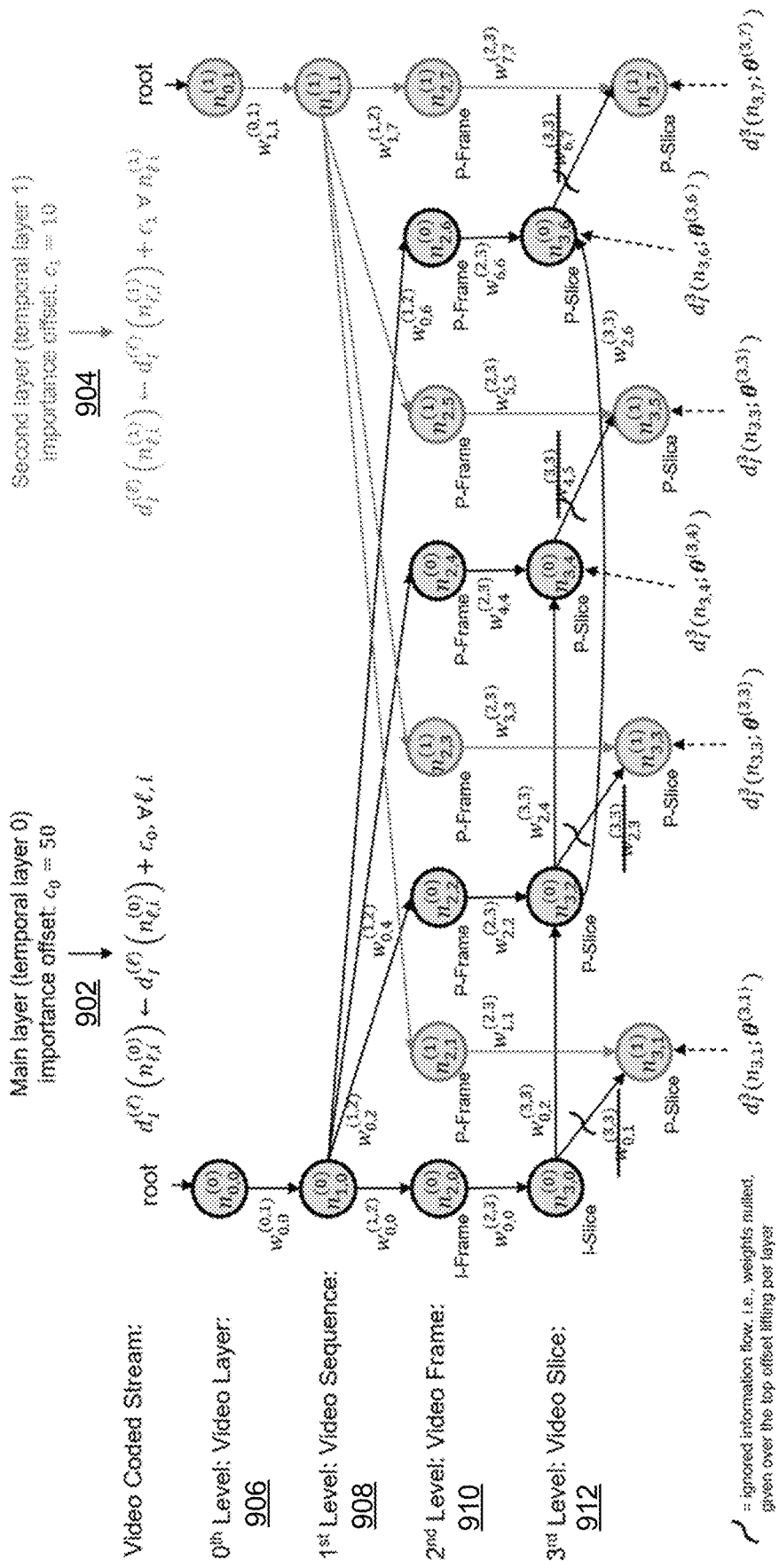
FIG. 9 depicts a representation of a graphical directed information flow model for a video coded stream with two temporal layers.

On the other hand, in other embodiments, video coded layer enclosed NAL units' importance may be increased by a positive offset to prioritize among various video coded layers with reduced complexity, such that inter-layers interactions/dependencies/relations of the graphical model are reduced to constant offsets. As an example, the base video coded layer 902 with id=0 may be assigned the constant importance offset of $c_0=50$. Consequently, in one embodiment comprising a video stream with two video coded temporal layers, a base layer at 60 fps will have an importance offset of 50, whereas the second temporal layer 904 streaming at, e.g., 120 fps, may be assigned a lower priority offset of $c_1=10$. As such all the importance indicators of the first temporal layer are to be updated as $$d_I^{(\ell)}\left(n_{\ell,i}^{(0)}\right)_{\leftarrow} d_I^{(\ell)}\left(n_{\ell,i}^{(0)}\right)_{+c_0} \forall\ n_{\ell,i}^{(0)} \in \text{video coded layer 0,} \quad \text{Eq. 2}$$

$$d_I^{(\ell)}\left(n_{\ell,i}^{(1)}\right)_{\leftarrow} d_I^{(\ell)}\left(n_{\ell,i}^{(1)}\right)_{+c_1} \forall\ n_{\ell,i}^{(1)} \in \text{video coded layer 1,} \quad \text{Eq. 3}$$

and respectively, the inter-layers information flows within the graphical model are discarded/ignored, e.g., their corresponding weights in Eq. 1 for the $3^{rd}$ level 912 and above (e.g., level 2 910, level1 908, and level0 906) are fixed to 0. These arrangements allow parallelization of the importance indicator processing for multi-layered video coded steams. An illustration of such an embodiment is presented through the graphical directed information model illustrated in FIG. 9. FIG. 9 depicts a representation of a graphical directed information flow model for a video coded stream with two temporal layers. A first temporal layer at lower frame-per-second frequency, noted as temporal layer 0, is jointly presented with a second temporal layer, noted as temporal layer 1, at higher frame-per-second frequency, (i.e., 2× oversampling). The figure outlines a reduced-complexity embodiment where importance offsets are used to avoid fully connected processing of the lower layers, which in turn parallelizes processing. One skilled in the art may extend and apply the concept detailed herein for the temporal video coded layers arrangements within a video elementary stream to spatial video coded layers arrangements as well.

In some embodiments the weights associated with the graphical directed information flow model depicted in Eq. 1 may be optimized to floating point representations other than binary values 0 and 1 by means of statistical learning algorithms tuned for specific types of video encodings and video streams (e.g., conversational XR, gaming XR, and/or the like). In other embodiments, additionally, the information-to-importance kernel mapping $d_I^{(\ell)}(\cdot\,;\boldsymbol{\theta}^{(\ell)})$ may be chosen and/or optimized similarly based on statistical learning where expert system knowledge is not applied to determine various rule-based mappings as the ones previously described, but instead statistical learning methods are deployed to learn optimal functional representations based on encoded video data content.

In a subset of such embodiments the information-to-importance kernel mapping may be restricted to linear or non-linear families of functions (e.g., polynomials, nomographic functions (e.g., functions that allow scalable aggregation (summation of various functional kernels) of distributed information along a graphic model), whereas other embodiments may jointly optimize the function space and the weight space by means of deep learning models and tools for a more accurate importance indication of NAL units relative to some qualitative and quantitative video encoded measures, e.g., minimum mean squared error ("MMSE"), PSNR, structural similarity index ("SSIM"), video multi-method assessment fusion ("VMAF"), assessing the importance that a NAL unit encoded video content may have on the video playback rendering if that NAL unit would be missing from the stream.

In a third embodiment, labelling/describing/marking the importance of video NAL units consists therefore of two high-level procedural steps that may be performed with a practical trade-off between low-delay processing and high granularity processing/output resolution. Concretely, these two steps are:

i) a video coded specific syntactic parsing and semantic extraction of video encoded data stream which yields a normalized feature set associated with every NAL unit of a video encoded stream, and ii) a feature processing information filter and mapping to an importance indicator associated with each NAL unit of the video encoded stream considering either model-based or non-model-based (e.g., statistically learned) structures among the hierarchically connected and enclosed plurality of NAL units forming the video encoded stream.

The outputs of such embodiments are typically scalar importance indicators, either in integer or floating-point formats, for every NAL unit belonging to a video encoded stream. This NAL level importance knowledge is of particular relevance in packet-switched networks such as 3GPP systems since for traffic over RTP/User Datagram Protocol ("UDP")/IP layers an ADU of a video coded stream, such as H.264, H.265 or alike, is in fact represented by a NAL unit or multiple NAL aggregated units (described by RTP hint samples enclosed in an RTP hint track), e.g., see 3GPP Technical Specification TS 26.244 (v 16.1.0—October 2020). Digital cellular telecommunications system (Phase 2+) (GSM); Universal Mobile Telecommunications System (UMTS); LTE; 5G; Transparent end-to-end packet switched streaming service (PSS); 3GPP file format (3GP) (Release 16). As such the NAL level importance knowledge directly provides ADU awareness over any packet-switched network, including but not limited to 3GPP CN and RAN realizations.

As a consequence, this video traffic ADU importance awareness may benefit distributed processing systems in taking better decisions and performing subsystem-based/block-based optimizations among their components. An embodiment in this sense is the application of such video codec NAL importance to RAN components and subsystems. Such an embodiment is therefore aware of the video codec NAL importance, and consequently, is aware of the traffic relevance of the served video coded data. This awareness may further be leveraged in decision making at the RAN level where the importance indicator of NAL units may prioritize certain radio specific control operations and configurations, e.g., packet scheduling, radio power control, radio frequency and spectrum resource allocation, PHY modulation and coding scheme ("MCS") selection, HARQ preemptions, multi-antenna/multiple transmission reception point ("TRP") transmissions and schemes, and/or the like.

Figure 10:
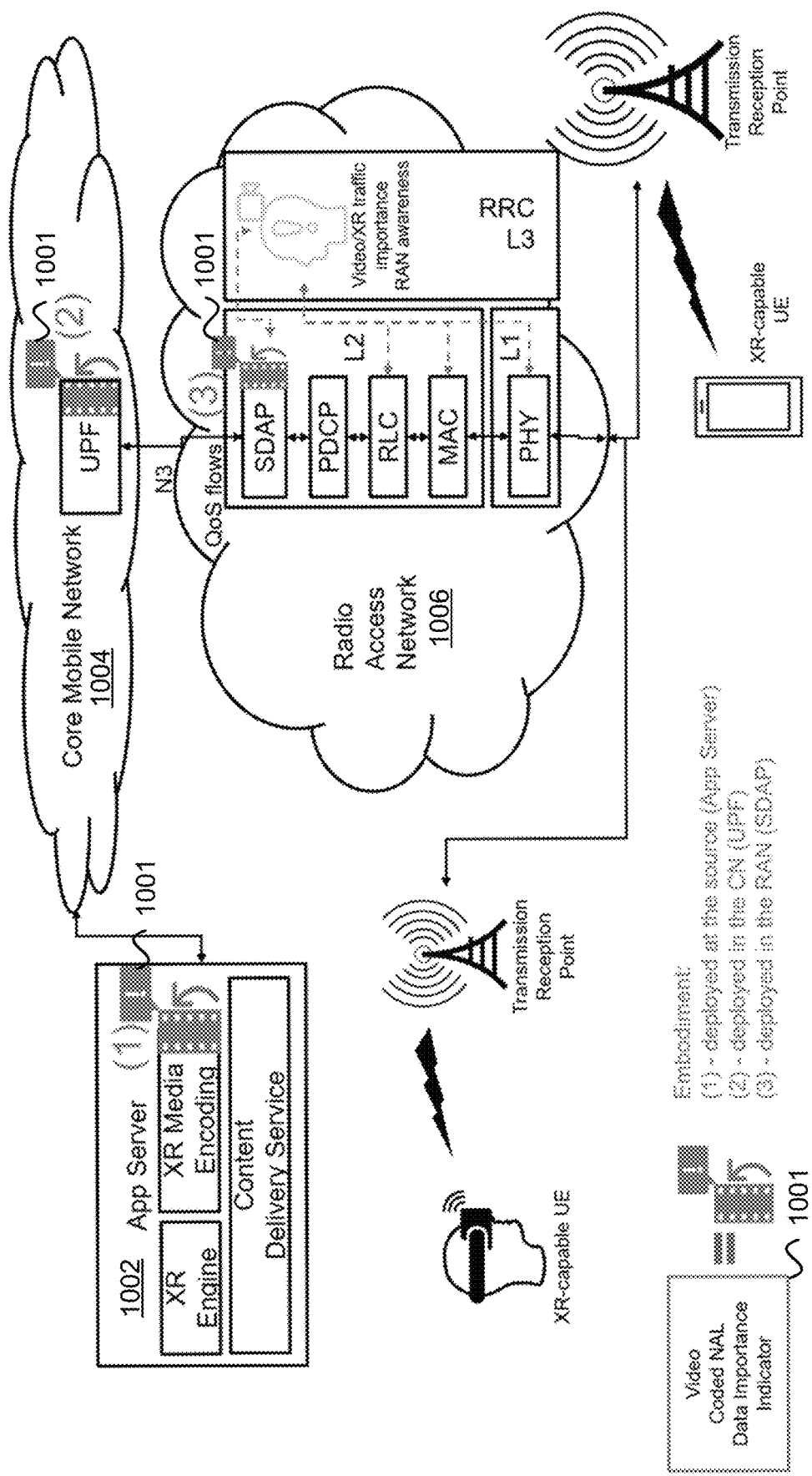
FIG. 10 depicts an embodiment set of video codec-aware RAN configurations.

The derivation of video encoded NAL units' importance may be performed in some embodiments at the source, e.g., at the application server 1002 as shown in FIG. 10. The importance indicators 1001 in such embodiments will be then sent over a CN 1004 to the RAN 1006 synchronized to their corresponding NAL units as annotation metadata describing the importance of the corresponding packets encapsulating the NAL video coded content. This signaling mechanism may be incorporated in some embodiments into existing control protocols and procedures for communications between the CN 1004 and RAN 1006 over the UPF-SDAP interfaces. In other embodiments, the NAL units' importance annotation metadata may be enclosed in header supplementary information corresponding to packet-based transport/network protocols carrying the NAL units' information, e.g., IP. RAN embodiments shall therefore be able to extract the annotated importance indicators 1001 of the NAL units and subsequently become aware of the video coded NAL units' importance.

In other embodiments, the derivation of video coded NAL units' importance may be embedded at the level of the CN 1004, as highlighted in FIG. 10, as one of the network functions, or as a part of a network function, e.g., a network function extension, (e.g., an extension of the UPF functionality for network slices serving XR/immersive type of applications), respectively. The derived video coded NAL units' importance shall similarly be synchronized as annotation metadata describing the importance of packets encapsulating their corresponding NAL video coded content over the UPF interfaces towards the RAN.

On the other hand, to avoid extensive synchronization needs and slight network overhead induced by annotating metadata, in some embodiments, as displayed in FIG. 10, the derivation of video coded NAL units' importance may be embedded directly at the RAN 1006 level. This may be achieved in one embodiment as an extension of the SDAP layer functionality specific to video coded data transmissions, or, in another embodiment, as an intelligent on-demand filtering functionality provided prior/post the SDAP layer functionality but before the PDCP layer.

The derived importance indicator 1001 and its mapping to some radio priority policy (e.g., VERY HIGH, HIGH, MEDIUM, LOW, VERY LOW priority, or the like) at the RAN level shall be performed in some embodiments by the Radio Resource Control ("RRC")/MAC-Control Element ("MAC-CE")/Downlink Control Information ("DCI") which in turn may use this knowledge to optimize the RAN lower layers and subsystems. This optimization is thus to be performed adaptively with low delay and accordingly to the statistical/predicted knowledge of the wireless media conditions to meet with high guarantees the QoS flows requirements associated with a video coded stream/IP packets of an immersive AR/VR/XR application of high-rate and low-latency.

In an embodiment, the derived importance indicator 1001 is indicated via a MAC-CE or a first DCI, wherein the indication indicates the derived importance for a sequence of frames (e.g., each frame of the sequence of frames can be indicated to have a different importance).

In an example, the UE determines an index of a frame belonging to the sequence of frames based on a second DCI which schedules the frame or a portion of the frame. In an example, the MAC-CE or the first DCI could indicate the length of the sequence. In another example, the length of the sequence is fixed or RRC configured. In another example, a pattern for a video sequence is RRC configured: e.g., I-P-P-P-P-P-P-P, and the MAC-CE or the first DCI would indicate importance for a subset of the sequence, for instance, in the I-P-P-P-P-P-P-P example, the MAC-CE or the first DCI would indicate only two importance indications: one importance indication corresponding to the 'I' frame, and another importance indication corresponding to the remaining 'P' frames.

Figure 11:
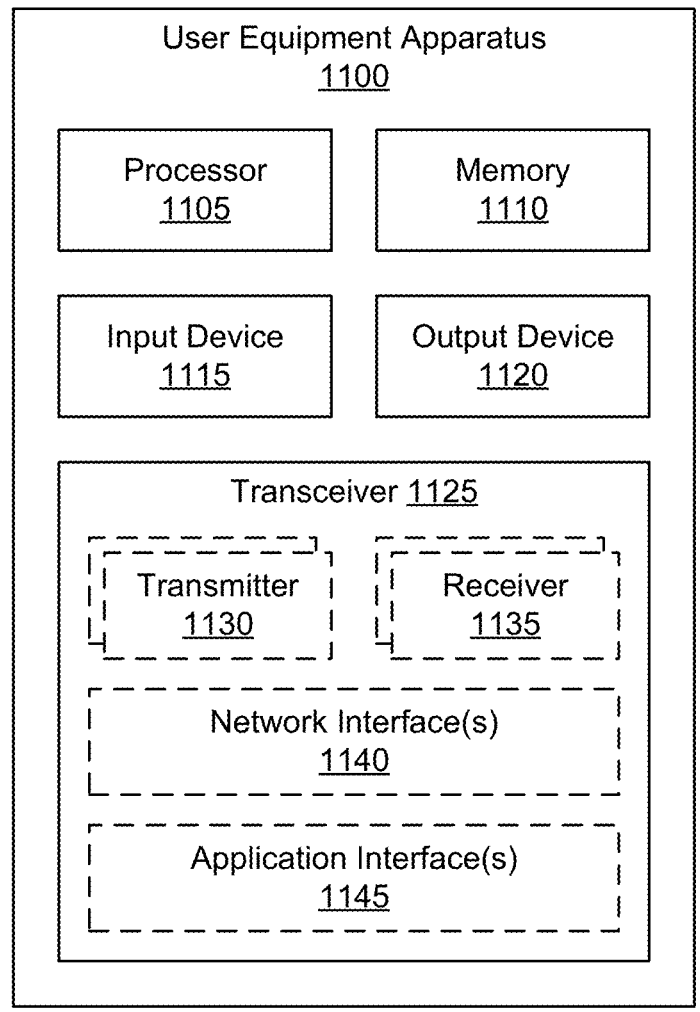
FIG. 11 is a block diagram illustrating one embodiment of a user equipment apparatus that may be used for video codec importance indication and RAN awareness configuration.

FIG. 11 depicts a user equipment apparatus 1100 that may be used for video codec importance indication and RAN awareness configuration, according to embodiments of the disclosure. In various embodiments, the user equipment apparatus 1100 is used to implement one or more of the solutions described above. The user equipment apparatus 1100 may be one embodiment of the remote unit 105 and/or the UE, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. In some embodiments, the transceiver 1125 communicates with one or more cells (or wireless coverage areas) supported by one or more base units 121. In various embodiments, the transceiver 1125 is operable on unlicensed spectrum. Moreover, the transceiver 1125 may include multiple UE panel supporting one or more beams. Additionally, the transceiver 1125 may support at least one network interface 1140 and/or application interface 1145. The application interface(s) 1145 may support one or more APIs. The network interface(s) 1140 may support 3GPP reference points, such as Uu, N1, PC5, etc. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125. In certain embodiments, the processor 1105 may include an application processor (also known as "main processor") which manages application-domain and operating system ("OS") functions and a baseband processor (also known as "baseband radio processor") which manages radio functions.

In various embodiments, the processor 1105 and transceiver 1125 control the user equipment apparatus 1100 to implement the above described UE behaviors. In one embodiment, the transceiver 1125 transmits a radio sensing capability report to a network node of a mobile wireless communication network in response to a capability indication request configuration received from the network node. In one embodiment, the transceiver 1125 receives, from the network node, configurations defining at least one sensing reference signal ("RS") pattern, a sensing task, and a sensing RS mode based on the radio sensing capability report.

In one embodiment, the processor 1105 encodes and compresses an uncompressed video sequence to a video coded stream formed of a plurality of network abstraction layer ("NAL") units using a selected video codec specification. In one embodiment, the processor 1105 extracts semantic information associated with the plurality of the NAL units according to a syntax elements and semantic knowledge base defined within the determined video codec specification. In one embodiment the processor 1105 extraction of semantic information associated with the plurality of the NAL units comprises determining semantic information associated with the plurality of the NAL units.

In one embodiment, the processor 1105 combines the extracted semantic information associated with the plurality of NAL units to form a plurality of feature sets that is correspondingly synchronized with the plurality of NAL units that enclose the extracted semantic information. In one embodiment the processor 1105 combining of the extracted semantic information associated with the plurality of NAL units to form a plurality of feature sets comprises determining a plurality of feature sets based on the extracted semantic information associated with the plurality of NAL units. In one embodiment, the processor 1105 determines an information-to-importance value for each of the plurality of NAL units based on the plurality of feature sets without performing video decoding of the video coded stream.

In one embodiment, the processor 1105 annotates the plurality of NAL units with the importance values for forming a plurality of ADUs of the video coded stream for packet-switched communication networks. In one embodiment, the processor 1105 signals the importance values for the plurality of ADUs and the plurality of underlying NAL units to a video coded traffic-aware transceiver.

In one embodiment, the transceiver 1125 is a video coded traffic-aware transceiver that processes video coded traffic awareness information to determine optimized radio scheduling and control procedures for transmit and receive operations for the video coded stream ADUs and transmits the video coded stream ADUs to a RAN based on the video coded traffic-aware optimizations.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to video codec importance indication and RAN awareness configuration. For example, the memory 1110 may store various parameters, panel/beam configurations, resource assignments, policies, and the like as described above. In certain embodiments, the memory 1110 also stores program code and related data, such as an operating system or other controller algorithms operating on the user equipment apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all, or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 communicates with one or more network functions of a mobile communication network via one or more access networks. The transceiver 1125 operates under the control of the processor 1105 to transmit messages, data, and other signals and also to receive messages, data, and other signals. For example, the processor 1105 may selectively activate the transceiver 1125 (or portions thereof) at particular times in order to send and receive messages.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers. In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi-transceiver chip, a system-on-a-chip, an ASIC, or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

Figure 12:
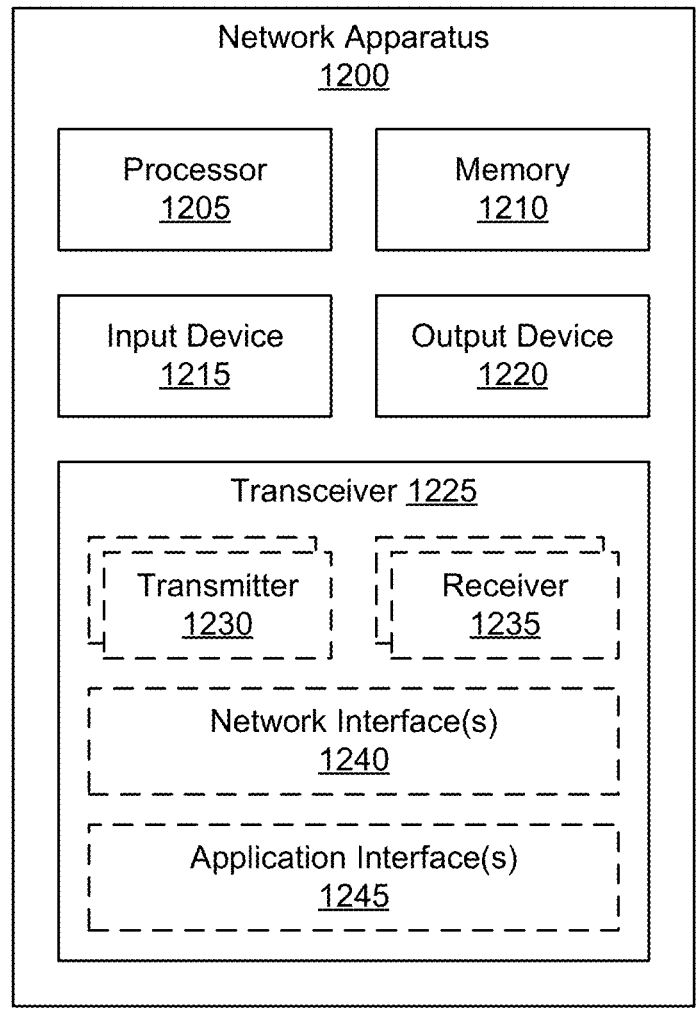
FIG. 12 is a block diagram illustrating one embodiment of a network apparatus that may be used for video codec importance indication and RAN awareness configuration.

FIG. 12 depicts a network apparatus 1200 that may be used for video codec importance indication and RAN awareness configuration, according to embodiments of the disclosure. In one embodiment, network apparatus 1200 may be one implementation of a RAN node, such as the base unit 121, the RAN node 210, or gNB, described above. Furthermore, the base network apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the network apparatus 1200 may not include any input device 1215 and/or output device 1220. In various embodiments, the network apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more remote units 105. Additionally, the transceiver 1225 may support at least one network interface 1240 and/or application interface 1245. The application interface(s) 1245 may support one or more APIs. The network interface(s) 1240 may support 3GPP reference points, such as Uu, N1, N2 and N3. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a CPU, a GPU, an auxiliary processing unit, a FPGA, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225. In certain embodiments, the processor 1205 may include an application processor (also known as "main processor") which manages application-domain and operating system ("OS") functions and a baseband processor (also known as "baseband radio processor") which manages radio function.

The memory 1210, in one embodiment, is a computer readable storage medium. In some embodiments, the memory 1210 includes volatile computer storage media. For example, the memory 1210 may include a RAM, including DRAM, SDRAM, and/or SRAM. In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to video codec importance indication and RAN awareness configuration. For example, the memory 1210 may store parameters, configurations, resource assignments, policies, and the like, as described above. In certain embodiments, the memory 1210 also stores program code and related data, such as an operating system or other controller algorithms operating on the network apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the network apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. One or more transmitters 1230 may be used to communicate with the UE, as described herein. Similarly, one or more receivers 1235 may be used to communicate with network functions in the non-public network ("NPN"), PLMN and/or RAN, as described herein. Although only one transmitter 1230 and one receiver 1235 are illustrated, the network apparatus 1200 may have any suitable number of transmitters 1230 and receivers 1235. Further, the transmitter(s) 1230 and the receiver(s) 1235 may be any suitable type of transmitters and receivers.

In one embodiment, the processor 1205 detects a plurality of video coded NAL units of a video coded stream according to defined syntax elements of a determined video codec specification. In one embodiment, the processor 1205 extracts semantic information associated with the plurality of the NAL units according to a syntax elements and semantic knowledge base defined within the determined video codec specification.

In one embodiment, the processor 1205 combines the extracted semantic information associated with the plurality of NAL units to form a plurality of feature sets that is correspondingly synchronized with the plurality of NAL units that enclose the extracted semantic information. In one embodiment, the processor 1205 determines an information-to-importance value for each of the plurality of NAL units based on the plurality of feature sets without performing video decoding of the video coded stream. In one embodiment, the processor 1205 indicates the determined information-to-importance value for each of the plurality of NAL units of the determined video codec specification to a video coded traffic-aware transceiver for scheduling video traffic based on the indicated information-to-importance value.

In one embodiment, the processor 1205 parses the plurality of detected video coded NAL units as syntax elements of the determined video codec specification for extracting the semantic information. In one embodiment, the processor 1205 selects a video codec syntax and semantic filter out of a set of video codec syntax and semantic filter candidates based on the determined video codec specification and exposing the syntax elements and semantic knowledge base of the video codec specification.

In one embodiment, the processor 1205 performs intrinsic semantic information extraction by applying the selected video codec specification syntax and semantic filter to at least one of a NAL unit's header and a NAL unit's non-entropy coded payload to extract the semantic information content intrinsically contained within the video coded stream. In one embodiment, the intrinsic semantic information extraction is based on processing at least one NAL unit enclosed element selected from the group of video layer metadata information corresponding to one or more of a video layer identifier and a video layer priority information, video layer frames-per-second playback metadata information, video layer additional metadata for parsing layer-common video coded sequence information, video sequence resolution corresponding to at least a combination of width and height of a video coded frame of the sequence of video coded frames, video sequence chroma subsampling information, video sequence coding metadata information corresponding to one or more of a coding block size, a number of coded rows, and a number of coded columns within the sequence of video coded frames, video sequence number of maximally allowed reference frames for inter-frame motion prediction, video sequence additional metadata necessary for parsing sequence-common video coded picture information, video coded picture encoding mode configuration, video coded picture segmentation information into picture partitions, video coded picture additional metadata for parsing slice-common video coded slice information, video coded slice type, video coded slice payload size, video coded slice position within one or more of a video coded picture, a tile, and a sub-picture, video coded slice number of enclosed video coded rows, video coded slice payload size of each enclosed video coded row, and video coded slice reference list wherein the video coded reference list defines at least one reference slice for an inter-slice motion prediction and video encoding for a current slice enclosed within the NAL unit.

In one embodiment, the processor 1205 extends the intrinsic extracted semantic values and information using an extrinsic source of semantic information synchronized with the plurality of NAL units of the video coded stream as provided by a video encoding function implementing the video codec specification that generated the plurality of NAL units. In one embodiment, at least one of the extracted intrinsic semantic information and extrinsic semantic information of the determined video codec is at least one of combined, reduced, and post-processed into a plurality of normalized feature sets that are synchronized with the plurality of NAL units of the video coded stream.

In one embodiment, the determination of the information-to-importance value for each of the plurality of NAL units of the determined video codec specification comprising processing a hierarchical structure and encapsulation encoding of the video codec specification spanning over at least one hierarchy selected from the group of a video layer level, a video sequence level, a video coded frame level, a video coded slice level, and a video coded slice segment level.

In one embodiment, the processor 1205 models a graphical directed information flow of the processing of a NAL unit's hierarchical structure and encapsulation encoding towards the determination of the information-to-importance value for each of the plurality of NAL units based at least on an information-to-importance functional kernel and a recursive accumulation of information flow across the directed edges of the graphical directed information flow model formed of the plurality of NAL units as nodes.

In one embodiment the information-to-importance functional kernel $d_I^{(\ell)}(\cdot\,;\,\theta^{(\ell,i)})$ is defined for any level $\ell$ depth of the graphical directed information flow model processing as a functional parameter of a subset of the extracted feature set associated with a graph node i on the level $\ell$ as $\theta^{(\ell,i)}$.

In one embodiment, the recursive accumulation of information flow across the directed edges of the graphical directed information flow model formed of NAL unit nodes is limited to a weighted aggregation of intra-level directed edges and a direct lower level inter-level directed edges such that for a node i at level $\ell$, the accumulated importance value is obtained as $d_I^{(\ell)}(n_{\ell,i})$ $d_I^{(\ell)}(n_{\ell,i};\,\theta^{(\ell,i)})$ + $\sum_{j\ne i} w_{i,j}^{(\ell,\ell)} d_I^{(\ell)}(n_{\ell,j})$ +$\sum w_{i,k}^{(\ell,\ell+1)} d_I^{(\ell+1)}(n_{\ell+1,k})$ , wherein a weight of the aggregation between the node $n_{\ell,i}$ and a node j≠i at level $\ell$ is a scalar $w_{i,j}^{(\ell,\ell)}$, and a weight of the aggregation between the node $n_{\ell,i}$ and a node k at level $\ell+1$ is a scalar $w_{i,k}^{(\ell,\ell+1)}$.

In one embodiment, the processor 1205 limits the information-to-importance functional kernel $d_I^{(\ell)}(\cdot\,;\,\theta^{(\ell,i)})$ to a model-common information-to-importance functional kernel $d_I(\cdot\,;\,\theta^{(\ell,i)})$. In one embodiment, the information-to-importance functional kernel is a scalar constant for at least some of the graphical directed information flow model nodes and levels.

In one embodiment, the processor 1205 determines an importance value of the information-to-importance functional kernel for the video coded slice and/or slice segment level inversely proportional to the video compression gain relative to the uncompressed video picture resolution content under constant quality encodings such that frames that are compressed above a predefined threshold have low importance values and frames that are compressed below the predefined threshold have high importance values.

In one embodiment, the processor 1205 determines an importance value of the information-to-importance functional kernel for the video coded slice and/or slice segment level based on at least one selected from the group comprising a video coded sequence of pictures, a video frame type, a video slice type, and a video slice reference list.

In one embodiment, the processor 1205 simplifies a full connectivity of a plurality of video coding layers of at least one of spatial and temporal layer type to ignore graphical directed information flow model connections between layers at a lowest level and decoupling and offsetting the plurality of video coding layers by a constant scalar to determine their importance levels and their enclosed NAL units' importance levels.

In one embodiment, the processor 1205 optimizes the plurality of information-to-importance functional kernels and associated graphical directed information flow weights using statistical learning based on a generic set of training data of video coded sequences to at least one of minimize expected metric and maximize expected metric of visual rendering quality based on the plurality of feature sets associated with each of the plurality of NAL units of the video coded stream.

In one embodiment, the processor 1205 signals the information-to-importance values of the plurality of NAL units to at least one of a RAN and a UE for optimization of transmission, retransmission, and reception procedures associated with the video coded stream over at least one of a limited capacity and varying capacity wireless link, the signaling performed using at least one indication selected from the group of a RRC semi-static indication, a DCI indication, and a MAC-CE dynamic header information indication, the optimization of transmission, retransmission, and reception procedures comprising at least one of packet scheduling, radio power control, radio frequency and resource allocation, physical layer modulation and coding scheme selection, hybrid automatic repeat request retransmissions preemptions, and multi-antenna and multiple transmission reception point transmissions, beamforming, and spatial multiplexing procedures.

Figure 13:
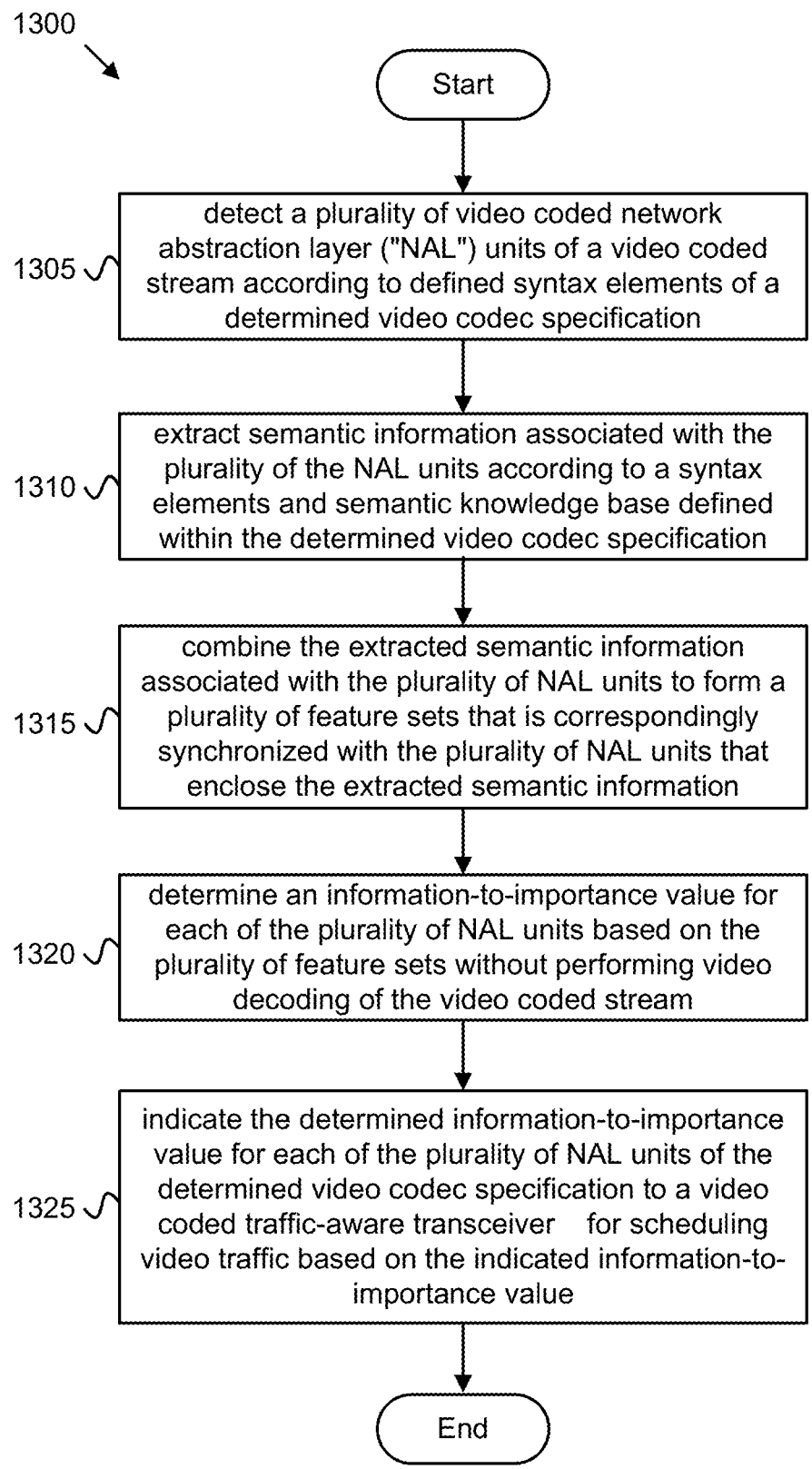
FIG. 13 is a flowchart diagram illustrating one embodiment of a method for video codec importance indication and RAN awareness configuration.

FIG. 13 is a flowchart diagram of a method 1300 for video codec importance indication and RAN awareness configuration. The method 1300 may be performed by a network entity such as a base node, a gNB, and/or the network equipment apparatus 1200. In some embodiments, the method 1300 may be performed by a processor executing program code, for example, a microcontroller, a microprocessor, a CPU, a GPU, an auxiliary processing unit, a FPGA, or the like.

In one embodiment, the method 1300 includes detecting 1305 a plurality of video coded NAL units of a video coded stream according to defined syntax elements of a determined video codec specification. In one embodiment, the method 1300 includes extracting 1310 semantic information associated with the plurality of the NAL units according to a syntax elements and semantic knowledge base defined within the determined video codec specification. In one embodiment, the method 1300 includes combining 1315 the extracted semantic information associated with the plurality of NAL units to form a plurality of feature sets that is correspondingly synchronized with the plurality of NAL units that enclose the extracted semantic information.

In one embodiment, the method 1300 includes determining 1320 an information-to-importance value for each of the plurality of NAL units based on the plurality of feature sets without performing video decoding of the video coded stream. In one embodiment, the method 1300 includes indicating 1325 the determined information-to-importance value for each of the plurality of NAL units of the determined video codec specification to a video coded traffic-aware transceiver for scheduling video traffic based on the indicated information-to-importance value, and the method 1300 ends.

Figure 14:
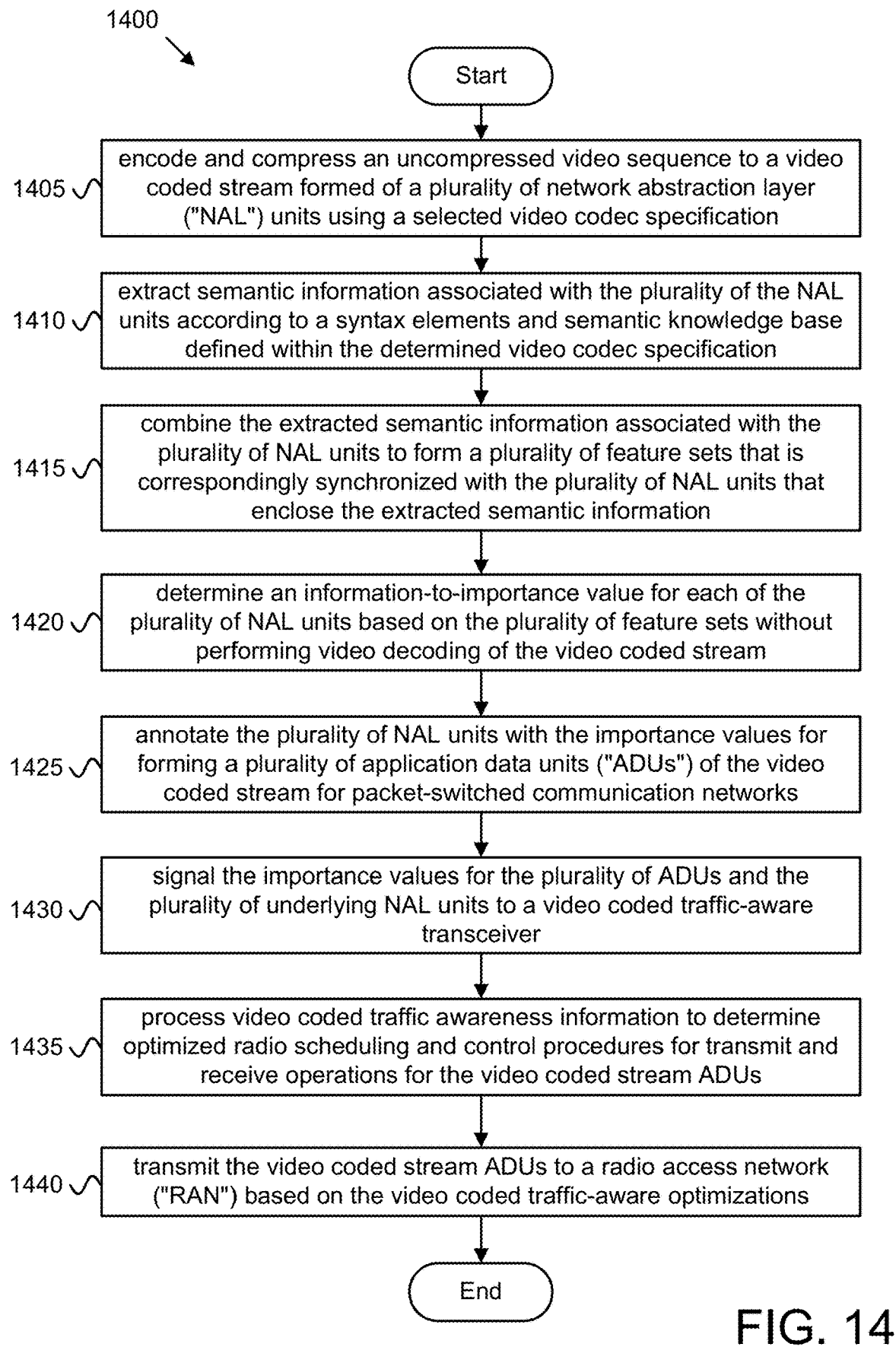
FIG. 14 is a flowchart diagram illustrating one embodiment of another method for video codec importance indication and RAN awareness configuration.

FIG. 14 is a flowchart diagram of a method 1400 for video codec importance indication and RAN awareness configuration. The method 1400 may be performed by a remote unit 105 such as a UE or a user equipment apparatus 1100. In some embodiments, the method 1400 may be performed by a processor executing program code, for example, a microcontroller, a microprocessor, a CPU, a GPU, an auxiliary processing unit, a FPGA, or the like.

In one embodiment, the method 1400 includes encoding and compressing 1405 an uncompressed video sequence to a video coded stream formed of a plurality of NAL units using a selected video codec specification. In one embodiment, the method 1400 includes extracting 1410 semantic information associated with the plurality of the NAL units according to a syntax elements and semantic knowledge base defined within the determined video codec specification.

In one embodiment, the method 1400 includes combining 1415 the extracted semantic information associated with the plurality of NAL units to form a plurality of feature sets that is correspondingly synchronized with the plurality of NAL units that enclose the extracted semantic information. In one embodiment, the method 1400 includes determining 1420 an information-to-importance value for each of the plurality of NAL units based on the plurality of feature sets without performing video decoding of the video coded stream.

In one embodiment, the method 1400 includes annotating 1425 the plurality of NAL units with the importance values for forming a plurality of ADUs of the video coded stream for packet-switched communication networks. In one embodiment, the method 1400 includes signaling 1430 the importance values for the plurality of ADUs and the plurality of underlying NAL units to a video coded traffic-aware transceiver. In one embodiment, the method 1400 includes processing 1435 video coded traffic awareness information to determine optimized radio scheduling and control procedures for transmit and receive operations for the video coded stream ADUs. In one embodiment, the method 1400 includes transmitting 1440 the video coded stream ADUs to a RAN based on the video coded traffic-aware optimizations, and the method 1400 ends.

A first apparatus is disclosed for video codec importance indication and RAN awareness configuration. The first apparatus may include a network entity such as a base node, a gNB, and/or the network equipment apparatus 1200. In some embodiments, the first apparatus includes a processor executing program code, for example, a microcontroller, a microprocessor, a CPU, a GPU, an auxiliary processing unit, a FPGA, or the like.

In one embodiment, the first apparatus includes a processor that detects a plurality of video coded network abstraction layer ("NAL") units of a video coded stream according to defined syntax elements of a determined video codec specification. In one embodiment, the processor extracts semantic information associated with the plurality of the NAL units according to a syntax elements and semantic knowledge base defined within the determined video codec specification.

In one embodiment, the processor combines the extracted semantic information associated with the plurality of NAL units to form a plurality of feature sets that is correspondingly synchronized with the plurality of NAL units that enclose the extracted semantic information. In one embodiment, the processor determines an information-to-importance value for each of the plurality of NAL units based on the plurality of feature sets without performing video decoding of the video coded stream. In one embodiment, the processor indicates the determined information-to-importance value for each of the plurality of NAL units of the determined video codec specification to a video coded traffic-aware transceiver for scheduling video traffic based on the indicated information-to-importance value.

In one embodiment, the processor parses the plurality of detected video coded NAL units as syntax elements of the determined video codec specification for extracting the semantic information. In one embodiment, the processor selects a video codec syntax and semantic filter out of a set of video codec syntax and semantic filter candidates based on the determined video codec specification and exposing the syntax elements and semantic knowledge base of the video codec specification.

In one embodiment, the processor performs intrinsic semantic information extraction by applying the selected video codec specification syntax and semantic filter to at least one of a NAL unit's header and a NAL unit's non-entropy coded payload to extract the semantic information content intrinsically contained within the video coded stream. In one embodiment, the intrinsic semantic information extraction is based on processing at least one NAL unit enclosed element selected from the group of video layer metadata information corresponding to one or more of a video layer identifier and a video layer priority information, video layer frames-per-second playback metadata information, video layer additional metadata for parsing layer-common video coded sequence information, video sequence resolution corresponding to at least a combination of width and height of a video coded frame of the sequence of video coded frames, video sequence chroma subsampling information, video sequence coding metadata information corresponding to one or more of a coding block size, a number of coded rows, and a number of coded columns within the sequence of video coded frames, video sequence number of maximally allowed reference frames for inter-frame motion prediction, video sequence additional metadata necessary for parsing sequence-common video coded picture information, video coded picture encoding mode configuration, video coded picture segmentation information into picture partitions, video coded picture additional metadata for parsing slice-common video coded slice information, video coded slice type, video coded slice payload size, video coded slice position within one or more of a video coded picture, a tile, and a sub-picture, video coded slice number of enclosed video coded rows, video coded slice payload size of each enclosed video coded row, and video coded slice reference list wherein the video coded reference list defines at least one reference slice for an inter-slice motion prediction and video encoding for a current slice enclosed within the NAL unit.

In one embodiment, the processor extends the intrinsic extracted semantic values and information using an extrinsic source of semantic information synchronized with the plurality of NAL units of the video coded stream as provided by a video encoding function implementing the video codec specification that generated the plurality of NAL units. In one embodiment, at least one of the extracted intrinsic semantic information and extrinsic semantic information of the determined video codec is at least one of combined, reduced, and post-processed into a plurality of normalized feature sets that are synchronized with the plurality of NAL units of the video coded stream.

In one embodiment, the determination of the information-to-importance value for each of the plurality of NAL units of the determined video codec specification comprising processing a hierarchical structure and encapsulation encoding of the video codec specification spanning over at least one hierarchy selected from the group of a video layer level, a video sequence level, a video coded frame level, a video coded slice level, and a video coded slice segment level.

In one embodiment, the processor models a graphical directed information flow of the processing of a NAL unit's hierarchical structure and encapsulation encoding towards the determination of the information-to-importance value for each of the plurality of NAL units based at least on an information-to-importance functional kernel and a recursive accumulation of information flow across the directed edges of the graphical directed information flow model formed of the plurality of NAL units as nodes.

In one embodiment, the information-to-importance functional kernel $d_I^{(\ell)}(\cdot\,;\,\theta^{(\ell,i)})$ is defined for any level $\ell$ depth of the graphical directed information flow model processing as a functional parameter of a subset of the extracted feature set associated with a graph node i on the level $\ell$ as $\theta^{(\ell,i)}$.

In one embodiment, the recursive accumulation of information flow across the directed edges of the graphical directed information flow model formed of NAL unit nodes is limited to a weighted aggregation of intra-level directed edges and a direct lower level inter-level directed edges such that for a node i at level $\ell$, the accumulated importance value is obtained as $d_I^{(\ell)}(n_{\ell,i})$ $d_I^{(\ell)}(n_{\ell,i};\,\theta^{(\ell,i)})$ + $\Sigma_j w_{i,j}^{(\ell,\ell)} d_I^{(\ell)}(n_{\ell,j})$ + $\Sigma w_{i,k}^{(\ell,\ell+1)} d_I^{(\ell+1)}(n_{\ell+1,k})$, wherein a weight of the aggregation between the node $n_{\ell,i}$ and a node j≠i at level $\ell$ is a scalar $w_{i,j}^{(\ell,\ell)}$, and a weight of the aggregation between the node $n_{\ell,i}$ and a node k at level $\ell$ +1 is a scalar $w_{i,k}^{(\ell,\ell+1)}$.

In one embodiment, the processor limits the information-to-importance functional kernel $d_I^{(\ell)}(\cdot\,;\,\theta^{(\ell,i)})$ to a model-common information-to-importance functional kernel $d_I(\cdot\,;\,\theta^{(\ell,i)})$. In one embodiment, the information-to-importance functional kernel is a scalar constant for at least some of the graphical directed information flow model nodes and levels.

In one embodiment, the processor determines an importance value of the information-to-importance functional kernel for the video coded slice and/or slice segment level inversely proportional to the video compression gain relative to the uncompressed video picture resolution content under constant quality encodings such that frames that are compressed above a predefined threshold have low importance values and frames that are compressed below the predefined threshold have high importance values.

In one embodiment, the processor determines an importance value of the information-to-importance functional kernel for the video coded slice and/or slice segment level based on at least one selected from the group comprising a video coded sequence of pictures, a video frame type, a video slice type, and a video slice reference list.

In one embodiment, the processor simplifies a full connectivity of a plurality of video coding layers of at least one of spatial and temporal layer type to ignore graphical directed information flow model connections between layers at a lowest level and decoupling and offsetting the plurality of video coding layers by a constant scalar to determine their importance levels and their enclosed NAL units' importance levels.

In one embodiment, the processor optimizes the plurality of information-to-importance functional kernels and associated graphical directed information flow weights using statistical learning based on a generic set of training data of video coded sequences to at least one of minimize expected metric and maximize expected metric of visual rendering quality based on the plurality of feature sets associated with each of the plurality of NAL units of the video coded stream.

In one embodiment, the processor signals the information-to-importance values of the plurality of NAL units to at least one of a radio access network ("RAN") and a user equipment ("UE") for optimization of transmission, retransmission, and reception procedures associated with the video coded stream over at least one of a limited capacity and varying capacity wireless link, the signaling performed using at least one indication selected from the group of a radio resource control ("RRC") semi-static indication, a downlink control information ("DCI") indication, and a medium access control control-elements ("MAC-CE") dynamic header information indication, the optimization of transmission, retransmission, and reception procedures comprising at least one of packet scheduling, radio power control, radio frequency and resource allocation, physical layer modulation and coding scheme selection, hybrid automatic repeat request retransmissions preemptions, and multi-antenna and multiple transmission reception point transmissions, beamforming, and spatial multiplexing procedures.

A first method is disclosed for video codec importance indication and RAN awareness configuration. The first method may be performed by a network entity such as a base node, a gNB, and/or the network equipment apparatus 1200. In some embodiments, the first method may be performed by a processor executing program code, for example, a microcontroller, a microprocessor, a CPU, a GPU, an auxiliary processing unit, a FPGA, or the like.

In one embodiment, the first method includes detecting a plurality of video coded network abstraction layer ("NAL") units of a video coded stream according to defined syntax elements of a determined video codec specification. In one embodiment, the first method includes extracting semantic information associated with the plurality of the NAL units according to a syntax elements and semantic knowledge base defined within the determined video codec specification.

In one embodiment, the first method includes combining the extracted semantic information associated with the plurality of NAL units to form a plurality of feature sets that is correspondingly synchronized with the plurality of NAL units that enclose the extracted semantic information. In one embodiment, the first method includes determining an information-to-importance value for each of the plurality of NAL units based on the plurality of feature sets without performing video decoding of the video coded stream. In one embodiment, the first method includes indicating the determined information-to-importance value for each of the plurality of NAL units of the determined video codec specification to a video coded traffic-aware transceiver for scheduling video traffic based on the indicated information-to-importance value.

In one embodiment, the first method includes parsing the plurality of detected video coded NAL units as syntax elements of the determined video codec specification for extracting the semantic information. In one embodiment, the first method includes selecting a video codec syntax and semantic filter out of a set of video codec syntax and semantic filter candidates based on the determined video codec specification and exposing the syntax elements and semantic knowledge base of the video codec specification.

In one embodiment, the first method includes performing intrinsic semantic information extraction by applying the selected video codec specification syntax and semantic filter to at least one of a NAL unit's header and a NAL unit's non-entropy coded payload to extract the semantic information content intrinsically contained within the video coded stream. In one embodiment, the intrinsic semantic information extraction is based on processing at least one NAL unit enclosed element selected from the group of video layer metadata information corresponding to one or more of a video layer identifier and a video layer priority information, video layer frames-per-second playback metadata information, video layer additional metadata for parsing layer-common video coded sequence information, video sequence resolution corresponding to at least a combination of width and height of a video coded frame of the sequence of video coded frames, video sequence chroma subsampling information, video sequence coding metadata information corresponding to one or more of a coding block size, a number of coded rows, and a number of coded columns within the sequence of video coded frames, video sequence number of maximally allowed reference frames for inter-frame motion prediction, video sequence additional metadata necessary for parsing sequence-common video coded picture information, video coded picture encoding mode configuration, video coded picture segmentation information into picture partitions, video coded picture additional metadata for parsing slice-common video coded slice information, video coded slice type, video coded slice payload size, video coded slice position within one or more of a video coded picture, a tile, and a sub-picture, video coded slice number of enclosed video coded rows, video coded slice payload size of each enclosed video coded row, and video coded slice reference list wherein the video coded reference list defines at least one reference slice for an inter-slice motion prediction and video encoding for a current slice enclosed within the NAL unit.

In one embodiment, the first method includes extending the intrinsic extracted semantic values and information using an extrinsic source of semantic information synchronized with the plurality of NAL units of the video coded stream as provided by a video encoding function implementing the video codec specification that generated the plurality of NAL units. In one embodiment, at least one of the extracted intrinsic semantic information and extrinsic semantic information of the determined video codec is at least one of combined, reduced, and post-processed into a plurality of normalized feature sets that are synchronized with the plurality of NAL units of the video coded stream.

In one embodiment, the determination of the information-to-importance value for each of the plurality of NAL units of the determined video codec specification comprising processing a hierarchical structure and encapsulation encoding of the video codec specification spanning over at least one hierarchy selected from the group of a video layer level, a video sequence level, a video coded frame level, a video coded slice level, and a video coded slice segment level.

In one embodiment, the first method includes modeling a graphical directed information flow of the processing of a NAL unit's hierarchical structure and encapsulation encoding towards the determination of the information-to-importance value for each of the plurality of NAL units based at least on an information-to-importance functional kernel and a recursive accumulation of information flow across the directed edges of the graphical directed information flow model formed of the plurality of NAL units as nodes.

In one embodiment, the information-to-importance functional kernel $d_I^{(\ell)}(\cdot\,;\,\theta^{(\ell,i)})$ is defined for any level $\ell$ depth of the graphical directed information flow model processing as a functional parameter of a subset of the extracted feature set associated with a graph node i on the level $\ell$ as $\theta^{(\ell,i)}$.

In one embodiment, the recursive accumulation of information flow across the directed edges of the graphical directed information flow model formed of NAL unit nodes is limited to a weighted aggregation of intra-level directed edges and a direct lower level inter-level directed edges such that for a node i at level $\ell$, the accumulated importance value is obtained as $d_I^{(\ell)}(n_{\ell,i})\ d_I^{(\ell)}(n_{\ell,i};\,\theta^{(\ell,i)}) + \Sigma_{j \neq i} w_{i,j}^{(\ell,\ell)} d_I^{(\ell)}(n_{\ell,j}) + \Sigma_k w_{i,k}^{(\ell,\ell+1)} d_I^{(\ell+1)}(n_{\ell+1,k})$, wherein a weight of the aggregation between the node $n_{\ell,i}$ and a node $j \neq i$ at level $\ell$ is a scalar $w_{i,j}^{(\ell,\ell)}$, and a weight of the aggregation between the node $n_{\ell,i}$ and a node k at level $\ell+1$ is a scalar $w_{i,k}^{(\ell,\ell+1)}$.

In one embodiment, the first method includes limiting the information-to-importance functional kernel $d_I^{(\ell)}(\cdot\,;\,\boldsymbol{\theta}^{(\ell,i)})$ to a model-common information-to-importance functional kernel $d_I(\cdot\,;\,\boldsymbol{\theta}^{(\ell,i)})$. In one embodiment, the information-to-importance functional kernel is a scalar constant for at least some of the graphical directed information flow model nodes and levels.

In one embodiment, the first method includes determining an importance value of the information-to-importance functional kernel for the video coded slice and/or slice segment level inversely proportional to the video compression gain relative to the uncompressed video picture resolution content under constant quality encodings such that frames that are compressed above a predefined threshold have low importance values and frames that are compressed below the predefined threshold have high importance values.

In one embodiment, the first method includes determining an importance value of the information-to-importance functional kernel for the video coded slice and/or slice segment level based on at least one selected from the group comprising a video coded sequence of pictures, a video frame type, a video slice type, and a video slice reference list.

In one embodiment, the first method includes simplifying a full connectivity of a plurality of video coding layers of at least one of spatial and temporal layer type to ignore graphical directed information flow model connections between layers at a lowest level and decoupling and offsetting the plurality of video coding layers by a constant scalar to determine their importance levels and their enclosed NAL units' importance levels.

In one embodiment, the first method includes optimizing the plurality of information-to-importance functional kernels and associated graphical directed information flow weights using statistical learning based on a generic set of training data of video coded sequences to at least one of minimize expected metric and maximize expected metric of visual rendering quality based on the plurality of feature sets associated with each of the plurality of NAL units of the video coded stream.

In one embodiment, the first method includes signaling the information-to-importance values of the plurality of NAL units to at least one of a radio access network ("RAN") and a user equipment ("UE") for optimization of transmission, retransmission, and reception procedures associated with the video coded stream over at least one of a limited capacity and varying capacity wireless link, the signaling performed using at least one indication selected from the group of a radio resource control ("RRC") semi-static indication, a downlink control information ("DCI") indication, and a medium access control control-elements ("MAC-CE") dynamic header information indication, the optimization of transmission, retransmission, and reception procedures comprising at least one of packet scheduling, radio power control, radio frequency and resource allocation, physical layer modulation and coding scheme selection, hybrid automatic repeat request retransmissions preemptions, and multi-antenna and multiple transmission reception point transmissions, beamforming, and spatial multiplexing procedures.

A second apparatus is disclosed for video codec importance indication and RAN awareness configuration. The second apparatus may include a remote unit 105 such as a UE or a user equipment apparatus 1100. In some embodiments, the second apparatus includes a processor executing program code, for example, a microcontroller, a microprocessor, a CPU, a GPU, an auxiliary processing unit, a FPGA, or the like.

In one embodiment, the second apparatus includes a processor that encodes and compresses an uncompressed video sequence to a video coded stream formed of a plurality of network abstraction layer ("NAL") units using a selected video codec specification. In one embodiment, the processor extracts semantic information associated with the plurality of the NAL units according to a syntax elements and semantic knowledge base defined within the determined video codec specification.

In one embodiment, the processor combines the extracted semantic information associated with the plurality of NAL units to form a plurality of feature sets that is correspondingly synchronized with the plurality of NAL units that enclose the extracted semantic information. In one embodiment, the processor determines an information-to-importance value for each of the plurality of NAL units based on the plurality of feature sets without performing video decoding of the video coded stream.

In one embodiment, the processor annotates the plurality of NAL units with the importance values for forming a plurality of application data units ("ADUs") of the video coded stream for packet-switched communication networks. In one embodiment, the processor signals the importance values for the plurality of ADUs and the plurality of underlying NAL units to a video coded traffic-aware transceiver.

In one embodiment, the second apparatus includes a video coded traffic-aware transceiver that processes video coded traffic awareness information to determine optimized radio scheduling and control procedures for transmit and receive operations for the video coded stream ADUs and transmits the video coded stream ADUs to a radio access network ("RAN") based on the video coded traffic-aware optimizations.

A second method is disclosed for video codec importance indication and RAN awareness configuration. The second method may be performed by a remote unit 105 such as a UE or a user equipment apparatus 1100. In some embodiments, the second method may be performed by a processor executing program code, for example, a microcontroller, a microprocessor, a CPU, a GPU, an auxiliary processing unit, a FPGA, or the like.

In one embodiment, the second method includes encoding and compressing an uncompressed video sequence to a video coded stream formed of a plurality of network abstraction layer ("NAL") units using a selected video codec specification. In one embodiment, the second method includes extracting semantic information associated with the plurality of the NAL units according to a syntax elements and semantic knowledge base defined within the determined video codec specification.

In one embodiment, the second method includes combining the extracted semantic information associated with the plurality of NAL units to form a plurality of feature sets that is correspondingly synchronized with the plurality of NAL units that enclose the extracted semantic information. In one embodiment, the second method includes determining an information-to-importance value for each of the plurality of NAL units based on the plurality of feature sets without performing video decoding of the video coded stream.

In one embodiment, the second method includes annotating the plurality of NAL units with the importance values for forming a plurality of application data units ("ADUs") of the video coded stream for packet-switched communication networks. In one embodiment, the second method includes signaling the importance values for the plurality of ADUs and the plurality of underlying NAL units to a video coded traffic-aware transceiver.

In one embodiment, the second method includes processing video coded traffic awareness information to determine optimized radio scheduling and control procedures for transmit and receive operations for the video coded stream ADUs and transmitting the video coded stream ADUs to a radio access network ("RAN") based on the video coded traffic-aware optimizations.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network device apparatus, the apparatus comprising:
at least one memory; and
at least one processor coupled with the at least one memory and configured to cause the apparatus to:
detect a plurality of video coded network abstraction layer ("NAL") units of a video coded stream according to defined syntax elements of a determined video codec specification;
extract semantic information associated with the plurality of NAL units according to a syntax elements and semantic knowledge base defined within the determined video codec specification;
combine the extracted semantic information associated with the plurality of NAL units to form a plurality of feature sets comprising a plurality of NAL unit type parameters, the plurality of feature sets correspondingly synchronized with the plurality of NAL units that enclose the extracted semantic information;
determine an information-to-importance value for each of the plurality of NAL units based on a NAL unit type, a NAL unit size, and a hierarchical encoding of each of the plurality of feature sets without performing video decoding of the video coded stream; and
indicate the determined information-to-importance value for each of the plurality of NAL units of the determined video codec specification to a video coded traffic-aware transceiver for scheduling video traffic based on the indicated information-to-importance value.

2. The apparatus of claim 1, wherein the at least one processor is configured to cause the apparatus to parse the plurality of detected video coded NAL units as syntax elements of the determined video codec specification for extracting the semantic information.

3. The apparatus of claim 1, wherein the at least one processor is configured to cause the apparatus to select a video codec syntax and semantic filter from a set of video codec syntax and semantic filter candidates based on the determined video codec specification and exposing the syntax elements and semantic knowledge base of the video codec specification.

4. The apparatus of claim 3, wherein the at least one processor is configured to cause the apparatus to perform intrinsic semantic information extraction by applying the selected video codec syntax and semantic filter to at least one of a NAL unit's header and a NAL unit's non-entropy coded payload to extract the semantic information contained within the video coded stream.

5. The apparatus of claim 4, wherein the intrinsic semantic information extraction is based on processing at least one NAL unit enclosed element selected from a group of:

video layer metadata information corresponding to one or more of a video layer identifier and a video layer priority information;
video layer frames-per-second playback metadata information;
video layer additional metadata for parsing layer-common video coded sequence information;
video sequence resolution corresponding to at least a combination of width and height of a video coded frame of the sequence of video coded frames;
video sequence chroma subsampling information;
video sequence coding metadata information corresponding to one or more of a coding block size, a number of coded rows, and a number of coded columns within the sequence of video coded frames;
video sequence number of maximally allowed reference frames for inter-frame motion prediction;
video sequence additional metadata necessary for parsing sequence-common video coded picture information;
video coded picture encoding mode configuration;
video coded picture segmentation information into picture partitions;
video coded picture additional metadata for parsing slice-common video coded slice information;
video coded slice type;
video coded slice payload size;
video coded slice position within one or more of a video coded picture, a tile, and a sub-picture;
video coded slice number of enclosed video coded rows;
video coded slice payload size of each enclosed video coded row; and
video coded slice reference list wherein the video coded reference list defines at least one reference slice for an inter-slice motion prediction and video encoding for a current slice enclosed within the NAL unit.

6. The apparatus of claim 5, wherein the at least one processor is configured to cause the apparatus to extend the extracted intrinsic semantic information using an extrinsic source of semantic information synchronized with the plurality of NAL units of the video coded stream as provided by a video encoding function implementing the video codec specification that generated the plurality of NAL units.

7. The apparatus of claim 6, wherein at least one of the extracted intrinsic semantic information and extrinsic semantic information of the determined video codec is at least one of combined, reduced, and post-processed into a plurality of normalized feature sets that are synchronized with the plurality of NAL units of the video coded stream.

8. The apparatus of claim 1, wherein the determination of the information-to-importance value for each of the plurality of NAL units of the determined video codec specification comprises processing a hierarchical structure and encapsulation encoding of the video codec specification spanning over at least one hierarchy selected from a group of:
a video layer level;
a video sequence level;
a video coded frame level;
a video coded slice level; and
a video coded slice segment level.

9. The apparatus of claim 8, wherein the at least one processor is configured to cause the apparatus to model a graphical directed information flow of the processing of a NAL unit's hierarchical structure and encapsulation encoding towards the determination of the information-to-importance value for each of the plurality of NAL units based at least on an information-to-importance functional kernel $q^{(l)}(\cdot, \theta^{(l)})$ and a recursive accumulation of information flow across directed edges of the graphical directed information flow model formed of the plurality of NAL units as nodes.

10. The apparatus of claim 9, wherein the information-to-importance functional kernel $d_I^{(\ell)}(\,\cdot\,;\boldsymbol{\theta}^{(\ell,i)})$ is defined for any level $\ell$ depth of the graphical directed information flow model processing as a functional parameter of a subset of an extracted feature set associated with a graph node i on the level $\ell$ as $\boldsymbol{\theta}^{(\ell,i)}$.

11. The apparatus of claim 10, wherein the recursive accumulation of information flow across the directed edges of the graphical directed information flow model formed of NAL unit nodes is limited to a weighted aggregation of intra-level
 directed edges and a direct lower level inter-level directed edges such that for a node i at level $\ell$, wherein an accumulated importance value is obtained as $$d_I^{(\ell)}(n_{\ell,i})\ d_I^{(\ell)}(n_{\ell,i};\boldsymbol{\theta}^{(\ell,i)})\ +\Sigma_{j\neq i}\ w_{i,j}^{(\ell,\ell)} d_I^{(\ell)}(n_{\ell,j}) +\Sigma_k w_{i,k}^{(\ell,\ell+1)} d_I^{(\ell+1)}(n_{\ell+1,k}),$$

wherein a weight of the aggregation between the node $n_{\ell,i}$ and a node $j\neq i$ at level $\ell$ is a scalar $w_{i,j}^{(\ell,\ell)}$, and a weight of the aggregation between node $n_{\ell,i}$ and a node k at level
 $\ell +1$ is a scalar $w_{i,k}^{(\ell,\ell+1)}$.

12. The apparatus of claim 11, wherein the at least one processor is configured to cause the apparatus to limit the information-to-importance functional kernel
 $d_I^{(\ell)}(\,\cdot\,;\boldsymbol{\theta}^{(\ell,i)})$ to a model-common information-to-importance functional kernel
 $d_I(\,\cdot\,;\boldsymbol{\theta}^{(\ell,i)})$.

13. The apparatus of claim 9, wherein the information-to-importance functional kernel is a scalar constant for graphical directed information flow model nodes and levels.

14. The apparatus of claim 9, wherein the at least one processor is configured to cause the apparatus to determine an importance value of the information-to-importance functional kernel for the video coded slice or slice segment level inversely proportional to a video compression gain relative to an uncompressed video picture resolution content under constant quality encodings such that frames that are compressed above a predefined threshold have low importance values and frames that are compressed below the predefined threshold have high importance values.

15. The apparatus of claim 9, wherein the at least one processor is configured to cause the apparatus to determine an importance value of the information-to-importance functional kernel for the video coded slice or slice segment level based on at least one selected from a group comprising:
 a video coded sequence of pictures;
 a video frame type;
 a video slice type; and
 a video slice reference list.

16. The apparatus of claim 9, wherein the at least one processor is configured to cause the apparatus to simplify a full connectivity of a plurality of video coding layers of at least one of spatial and temporal layer type to ignore graphical directed information flow model connections between layers at a lowest level and decoupling and offsetting the plurality of video coding layers by a constant scalar to determine their importance levels and their enclosed NAL units' importance levels.

17. The apparatus of claim 9, wherein the at least one processor is configured to cause the apparatus to optimize a plurality of information-to-importance functional kernels and associated graphical directed information flow weights using statistical learning based on a generic set of training data of video coded sequences to at least one of minimize expected metric and maximize expected metric of visual rendering quality based on the plurality of feature sets associated with each of the plurality of NAL units of the video coded stream.

18. The apparatus of claim 1, wherein the at least one processor is configured to cause the apparatus to signal the information-to-importance values of the plurality of NAL units to at least one of a radio access network ("RAN") and a user equipment ("UE") for optimization of transmission, retransmission, and reception procedures associated with the video coded stream over at least one of a limited capacity and varying capacity wireless link, the signaling performed using at least one indication selected from a group of a radio resource control ("RRC") semi-static indication, a downlink control information ("DCI") indication, and a dynamic header information indication, the optimization of transmission, retransmission, and reception procedures comprising at least one of packet scheduling, radio power control, radio frequency and resource allocation, physical layer modulation and coding scheme selection, hybrid automatic repeat request retransmissions preemptions, and multi-antenna and multiple transmission reception point transmissions, beamforming, and spatial multiplexing procedures.

19. A method of a network device, the method comprising:
 detecting a plurality of video coded network abstraction layer ("NAL") units of a video coded stream according to defined syntax elements of a determined video codec specification;
 extracting semantic information associated with the plurality of NAL units according to a syntax elements and semantic knowledge base defined within the determined video codec specification;
 combining the extracted semantic information associated with the plurality of NAL units to form a plurality of feature sets comprising a plurality of NAL unit type parameters, the plurality of feature sets correspondingly synchronized with the plurality of NAL units that enclose the extracted semantic information;
 determining an information-to-importance value for each of the plurality of NAL units based on a NAL unit type, a NAL unit size, and a hierarchical encoding of each of the plurality of feature sets without performing video decoding of the video coded stream; and
 indicating the determined information-to-importance value for each of the plurality of NAL units of the determined video codec specification to a video coded traffic-aware transceiver for scheduling video traffic based on the indicated information-to-importance value.

20. A remote network device apparatus, the apparatus comprising:
 at least one memory; and
 at least one processor coupled with the at least one memory and configured to cause the apparatus to:
  encode and compress an uncompressed video sequence to a video coded stream formed of a plurality of network abstraction layer ("NAL") units using a selected video codec specification;
  extract semantic information associated with the plurality of NAL units according to a syntax elements and semantic knowledge base defined within the selected video codec specification;

combine the extracted semantic information associated with the plurality of NAL units to form a plurality of feature sets comprising a plurality of NAL unit type parameters, the plurality of feature sets correspondingly synchronized with the plurality of NAL units that enclose the extracted semantic information;

determine an information-to-importance value for each of the plurality of NAL units based on a NAL unit type, a NAL unit size, and a hierarchical encoding of each of the plurality of feature sets without performing video decoding of the video coded stream;

annotate the plurality of NAL units with the information-to-importance values for forming a plurality of application data units ("ADUs") of the video coded stream for packet-switched communication networks;

signal the information-to-importance values for the plurality of ADUs and the plurality of NAL units;

process video coded traffic awareness information to determine optimized radio scheduling and control procedures for transmit and receive operations for the video coded stream ADUs; and transmit the video coded stream ADUs to a radio access network ("RAN") based on video coded traffic-aware optimizations.

* * * * *